United States Patent
Iwaki et al.

(10) Patent No.: US 7,924,480 B2
(45) Date of Patent: Apr. 12, 2011

(54) EDGE DETECTING DEVICE, ELECTRONIC EQUIPMENT, AND EDGE DETECTING METHOD USING THE SAME

(75) Inventors: Kazuhiko Iwaki, Shizuoka (JP); Takayuki Takeda, Tokyo (JP)

(73) Assignees: NEC Access Technica, Ltd., Shizuoka (JP); NEC Engineering, Ltd., Tokyo (JP)

( * ) Notice: Subject to any disclaimer, the term of this patent is extended or adjusted under 35 U.S.C. 154(b) by 411 days.

(21) Appl. No.: 12/204,073

(22) Filed: Sep. 4, 2008

(65) Prior Publication Data
US 2009/0067758 A1 Mar. 12, 2009

(30) Foreign Application Priority Data
Sep. 10, 2007 (JP) .................. 2007-234383

(51) Int. Cl.
*H04N 1/04* (2006.01)
*H04N 1/38* (2006.01)
*H04N 1/40* (2006.01)

(52) U.S. Cl. ........ 358/488; 358/486; 358/497; 358/474; 358/464; 358/465; 358/449

(58) Field of Classification Search .................. 358/488, 358/486, 497, 494, 474, 464, 465, 449; 382/199, 382/312, 318, 319, 195; 399/211, 379, 380
See application file for complete search history.

(56) References Cited

U.S. PATENT DOCUMENTS

| | | | |
|---|---|---|---|
| 4,590,606 A | | 5/1986 | Rohrer |
| 5,126,792 A | * | 6/1992 | Iwata .......................... 399/169 |
| 5,973,797 A | | 10/1999 | Tanaka et al. |
| 6,169,612 B1 | * | 1/2001 | Deguchi ........................ 358/488 |
| 2003/0152150 A1 | | 8/2003 | Fujimoto et al. |
| 2009/0051983 A1 | * | 2/2009 | Shiga et al. .................... 358/488 |
| 2010/0020366 A1 | * | 1/2010 | Iwaki ........................... 358/474 |

FOREIGN PATENT DOCUMENTS

JP 1997247374 A 9/1997
JP 2005278200 A * 10/2005

OTHER PUBLICATIONS

European Search Report for EP 08 07 5756 completed Apr. 23, 2009.
S. McCanne, et al., "Low-Complexity Video Coding for Receiver-Driven Layered Multicast", IEEE Journal on Selected Areas in Communications, vol. 15, No. 6, Aug. 1997, p. 983-1001.

* cited by examiner

*Primary Examiner* — Cheukfan Lee

(57) ABSTRACT

An edge detecting device for detecting a position of an edge of an object includes a measuring circuit for emitting an inspection light to a linear inspecting area including the object, and measuring first light quantity of a reflected light of the inspection light reflected from the inspecting area in a first state and second light quantity of a reflected light of the inspection light reflected from the inspecting area in a second state, a calculation circuit for calculating a difference of the first light quantity and the second light quantity measured by the measuring circuit for each pixel with a first predetermined length, calculating first total differences of reflected lights from pixels with a second predetermined length located adjacent to an objective dot in one direction by totalizing differences between the first and the second light quantity reflected from each of the pixels, and calculating second total differences of reflected lights from the other pixels with the second predetermined length located adjacent to the objective dot in the other direction by totalizing differences between the first and the second light quantity reflected from each of the other pixels and a judgment circuit for judging the objective dot with the largest variation between the first total differences and the second total differences to be a position of the edge.

14 Claims, 13 Drawing Sheets

EDGE DETECTING DEVICE, ELECTRONIC EQUIPMENT, AND EDGE DETECTING METHOD USING THE SAME

INCORPORATION BY REFERENCE

This application is based upon and claims the benefit of priority from Japanese Patent Application No. JP 2007-234383, filed on Sep. 10, 2007, the disclosure of which is incorporated herein in its entirety by reference.

BACKGROUND OF THE INVENTION

1. Technical Field

The present invention relates to an edge detecting device, electronic equipment and an edge detection method for detecting an edge of an object. In particular, the present invention relates to the edge detecting device, the electronic equipment, and the edge detecting method for detecting the edge of the object by analyzing a reflected light from an inspecting region of inspection light emitted to the object arranged in the inspecting region.

2. Background Art

On equipment provided with an image reading function which reads images of a sheet, such as a scanner, a copying machine, a facsimile, a method of determining a sheet size by analyzing a reflected light of a light emitted to the sheet is known as one of methods to detect a sheet edge to determine the sheet size.

For example, an image reader disclosed by a related art 1 (Japanese Patent Application Laid-Open No. 1997-247374) determines the sheet size according to following processes. That is, the image reader illuminates a sheet and detects a reflected light while an apparatus cover is opened. Next, the image reader applies a light to the sheet and detects a reflected light while the apparatus cover is closed. An amount of the reflected light detected by the image reader does not change in an area where the sheet is arranged, since the sheet reflects the emitted light regardless of whether the apparatus cover is opened or closed. On the other hand, an amount of the reflected light detected by the image reader changes in an area where the sheet not arranged, since the emitted light is reflected by the closed apparatus cover while the apparatus cover is closed, and the reflected light is not detected while the apparatus cover is opened and the emitted light passes.

In the related art 1, amounts of the reflected light in a predetermined area when the apparatus cover is opened are determined, and amounts of that when the apparatus cover is closed are determined. Then, the amounts are compared each other. If variation of the amounts exceeds a predetermined threshold value, the sheet edge is detected and the sheet size is determined by judging that the sheet is not arranged in the predetermined area.

SUMMARY

A purpose of the present invention is to provide an edge detecting device, electronic equipment, and an edge detecting method for detecting an edge of an object with high accuracy irrespective of a position of the edge of the object, when image information of the object, such as a sheet, is read by a scanner, a copying machine, a fax machine, or the like.

An edge detecting device for detecting a position of an edge of an object according to an exemplary object of the invention includes a measuring circuit for emitting an inspection light to a linear inspecting area including the object, and measuring first light quantity of a reflected light of the inspection light reflected from the inspecting area in a first state and second light quantity of a reflected light of the inspection light reflected from the inspecting area in a second state, a calculation circuit for calculating a difference of the first light quantity and the second light quantity measured by the measuring circuit for each pixel with a first predetermined length, calculating first total differences of reflected lights from pixels with a second predetermined length located adjacent to an objective dot in one direction by totalizing differences between the first and the second light quantity reflected from each of the pixels, and calculating second total differences of reflected lights from the other pixels with the second predetermined length located adjacent to the objective dot in the other direction by totalizing differences between the first and the second light quantity reflected from each of the other pixels and a judgment circuit for judging the objective dot with the largest variation between the first total differences and the second total differences to be a position of the edge.

An electronic device for detecting a position of an edge of an object and performing a predetermined processing according to an exemplary object of the invention includes an emitting unit for emitting an inspection light to a linear inspecting area including the object, a reflective unit for reflecting the inspection light, a measuring circuit for measuring first light quantity of a reflected light of the inspection light reflected from the inspecting area in a first state and second light quantity of a reflected light of the inspection light from the inspecting area in a second state, a calculation circuit for calculating a difference of the first light quantity and the second light quantity measured by the measuring circuit for each pixel with a first predetermined length, calculating first total differences of reflected lights from pixels with a second predetermined length located adjacent to an objective dot in one direction by totalizing differences between the first and the second light quantity reflected from each of the pixels, and calculating second total differences of reflected lights from the other pixels with the second predetermined length located adjacent to the objective dot in the other direction by totalizing differences between the first and the second light quantity reflected from each of the other pixels and a judgment circuit for judging the objective dot with the largest variation between the first total differences and the second total differences to be a position of the edge.

An edge detection method for detecting a position of an edge of an object according to an exemplary object of the invention includes measuring first light quantity of a reflected light of an inspection light reflected from an inspecting area in a first state and second light quantity of a reflected light of the inspection light reflected from the inspecting area in a second state, the inspection light being emitted to the linear inspecting area including an object, calculating a difference of the first light quantity and the second light quantity for each pixel with a first predetermined length, calculating first total differences of reflected lights from pixels with a second predetermined length located adjacent to an objective dot in one direction by totalizing differences between the first and the second light quantity reflected from each of the pixels, calculating second total differences of reflected lights from the other pixels with the second predetermined length located adjacent to the objective dot in the other direction by totalizing differences between the first and the second light quantity reflected from each of the other pixels and judging the objective dot with the largest variation between the first total differences and the second total differences to be a position of the edge.

An edge detecting device for detecting a position of an edge of an object according to an exemplary object of the invention includes measuring means for emitting an inspection light to a linear inspecting area including the object, and measuring first light quantity of a reflected light of the inspection light reflected from the inspecting area in a first state and second light quantity of a reflected light of the inspection light reflected from the inspecting area in a second state calculation means for calculating a difference of the first light quantity and the second light quantity measured by the measuring means for each pixel with a first predetermined length, calculating first total differences of reflected lights from pixels with a second predetermined length located adjacent to an objective dot in one direction by totalizing differences between the first and the second light quantity reflected from each of the pixels and calculating second total differences of reflected lights from the other pixels with the second predetermined length located adjacent to the objective dot in the other direction by totalizing differences between the first and the second light quantity reflected from each of the other pixels and judging means for judging the objective dot with the largest variation between the first total differences and the second total differences to be a position of the edge.

BRIEF DESCRIPTION OF THE DRAWINGS

Exemplary features and advantages of the present invention will become apparent from the following detailed description when taken with the accompanying drawings in which:

FIG. 12 is a block diagram of an image reader 10D according to a fifth exemplary embodiment of the present invention; and.

EXEMPLARY EMBODIMENT

Exemplary embodiments of the present invention will now be described in detail in accordance with the accompanying drawings.

The First Exemplary Embodiment

Figure 1:
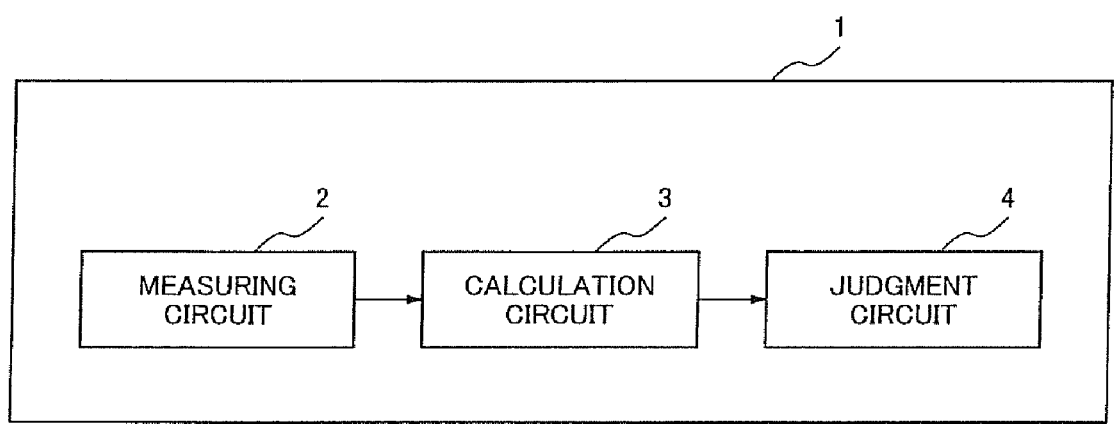
FIG. 1 is a block diagram of an edge detecting device 1 according to a first exemplary embodiment of the present invention.

An edge detecting device according to a first exemplary embodiment of the present invention will be described. FIG. 1 is a block diagram of an edge detecting device 1 according to the first embodiment. In FIG. 1, the edge detecting device 1 includes a measuring circuit 2, a calculation circuit 3 and a judgment circuit 4.

The measuring circuit 2 measures an amount of a reflected light from an inspecting region while an inspection light is emitted to the inspecting region, and outputs a measurement signal. The calculation circuit 3 receives the measurement signal outputted from the measuring circuit 2 and outputs a variation of total differences of the measurement signals reflected from pixels on the inspecting region mentioned below. The judgment circuit 4 detects a position of an edge of an object based on the variation of total differences for the pixels outputted from the calculation circuit 3, and outputs the position.

Detection of the edge of the object (for example, a sheet) in a linear inspecting region using the edge detecting device 1 of the first embodiment is described.

When an edge of a sheet in the inspecting region is detected, the measuring circuit 2 of the edge detecting device 1 measures an amount of the reflected light from the inspecting region in a first state (a first light quantity) and outputs a first measurement signal. Also, the measuring circuit 2 measures the amount of the reflected light from the inspecting region in a second state and outputs the second measurement signal (a second light quantity).

Here, the first state and the second state are defined as follows. When a light reflected by a predetermined reflective unit from the inspecting region is defined as "a reflected light from the reflective unit", in the second state, an amount of the reflected light from the reflective unit measured by the measuring circuit 2 is relatively larger than that of the reflected light from the reflective unit measured in the first state. For example, when the edge detecting device 1 is an image reader which reads image information printed in the sheet, a sheet cover can be applied as the reflective unit. Then, a state that the sheet cover is not completely closed on the inspecting region corresponds to the first state, and a state that the sheet cover is completely closed on the inspecting region corresponds to the second state.

In an area where the sheet does not arranged in the inspecting region, the second measurement signal outputted from the measuring circuit 2 during the sheet cover being completely closed (the second state) is larger than the first measurement signal outputted from the measuring circuit 2 during the sheet cover being not completely closed (the first state). Hereinafter, the first state is described as a semi-opened-state, and the second state is described as a closed-state.

Next, a procedure for detecting a position of a sheet edge using the first measurement signal and the second measurement signal by the edge detecting device 1 is described. Initially, the calculation circuit 3 subtracts the first measurement signal from the second measurement signal every a first predetermined length (in the first embodiment, every one pixel). Thereby, a difference between the first light quantity represented by the first measurement signal and the second light quantity represented by the second measurement signal is calculated.

Next, the calculation circuit 3 calculates a variation between first total differences and second total differences, that is, a variation of the total differences. So, the calculation circuit 3 totals the difference between the first light quantity and the second light quantity of some pixels in a second predetermined length (in the first embodiment, continuous 4 pixels) each adjacent to one side of a predetermined pixel (hereinafter, an objective dot) in the inspecting region and obtains the first total differences. Moreover, the calculation circuit 3 totals the difference between the first light quantity and the second light quantity of 4 pixels adjacent to the other side of the objective dot in the inspecting region and obtains the second total differences. Then, the calculation circuit 3 calculates the variation of the total differences by subtracting the second total differences from the first total differences.

For example, when the second predetermined length is assumed to be continuous 4 pixels, the calculation circuit 3 obtains the first total differences of the reflected lights from the continuous 4 pixels located adjacent to the objective dot in one direction by totalizing the differences between the first and the second light quantities reflected from each of the 4 pixels. Also, the calculation circuit 3 obtains the second total differences of the reflected lights from the other continuous 4 pixels located adjacent to the objective dot in the other direction by totalizing the differences between the first and the second light quantity reflected from each of the other 4 pixels. In this way, the differences between the first and the second light quantities in the first state and in the second state with respect to each of the 4 pixels adjacent to one and the other sides of the objective dot are totalized, and the first and the second total differences associated with the objective dot is obtained.

And the calculation circuit 3 calculates a difference between the first total differences and the second total differences with respect to the objective dot, and outputs an absolute value of the difference as the variation of the total differences.

After outputting the variation of the total differences with respect to the objective dot, the calculation circuit 3 sets a pixel adjacent to the objective dot in a line direction as a new objective dot and also outputs variation of the total differences with respect to the new objective dot.

After the calculation circuit 3 outputs the variation of the differences with respect to all the pixels in the inspecting region, the judgment circuit 4 receives the variation of the differences with respect to all the pixels. The judgment circuit 4 judges that the pixel having the largest variation of the total differences is located at the sheet edge.

The reason why the pixel having the largest variation of the total differences is considered to be located at the sheet edge is described below.

The first light quantity and the second light quantity in a position where the sheet is arranged are almost equal, because both the first light quantity and the second light quantity in the position are amounts of lights reflected by the same sheet. On the other hand, the first light quantity and the second light quantity in a position where the sheet is not arranged are different, because an inspection light is reflected by the sheet cover and is measured by the measuring circuit 2 in a closed-state, while the inspection light passes without being reflected by the sheet cover in a semi-opened-state. Therefore, in the position in which the sheet is arranged, the difference between the first light quantity and the second light quantity becomes the minimum value (i.e. zero), and the difference becomes the maximum value in the position in which the sheet is not arranged. That is, with respect to a pixel located at a sheet edge, the absolute value of the difference between the total differences of a side in which the sheet is arranged (the first total differences) and the total differences of a side in which the sheet is not arranged (the second total differences) is the largest. That is, the variation of the total differences for the objective dot located at the sheet edge is the largest.

Here, the reflective unit is not limited to the sheet cover. The reflective unit may be arranged in the edge detecting device 1 only when the second light quantity is measured. The inspection light emitted to the inspecting region may be emitted from an emitting unit equipped in the edge detecting device 1 or from the emitting unit arranged outside while the edge is detected.

As mentioned above, the edge detecting device 1 according to the first exemplary embodiment calculates the variation of the total differences, and judges that the pixel with the largest variation of the total differences is located at a position of an edge of an object. Since the variation of the total differences becomes an extreme value at the edge of the object, the edge of the object is exactly detected irrespective of the position of the edge of the object.

The Second Exemplary Embodiment

Figure 2:
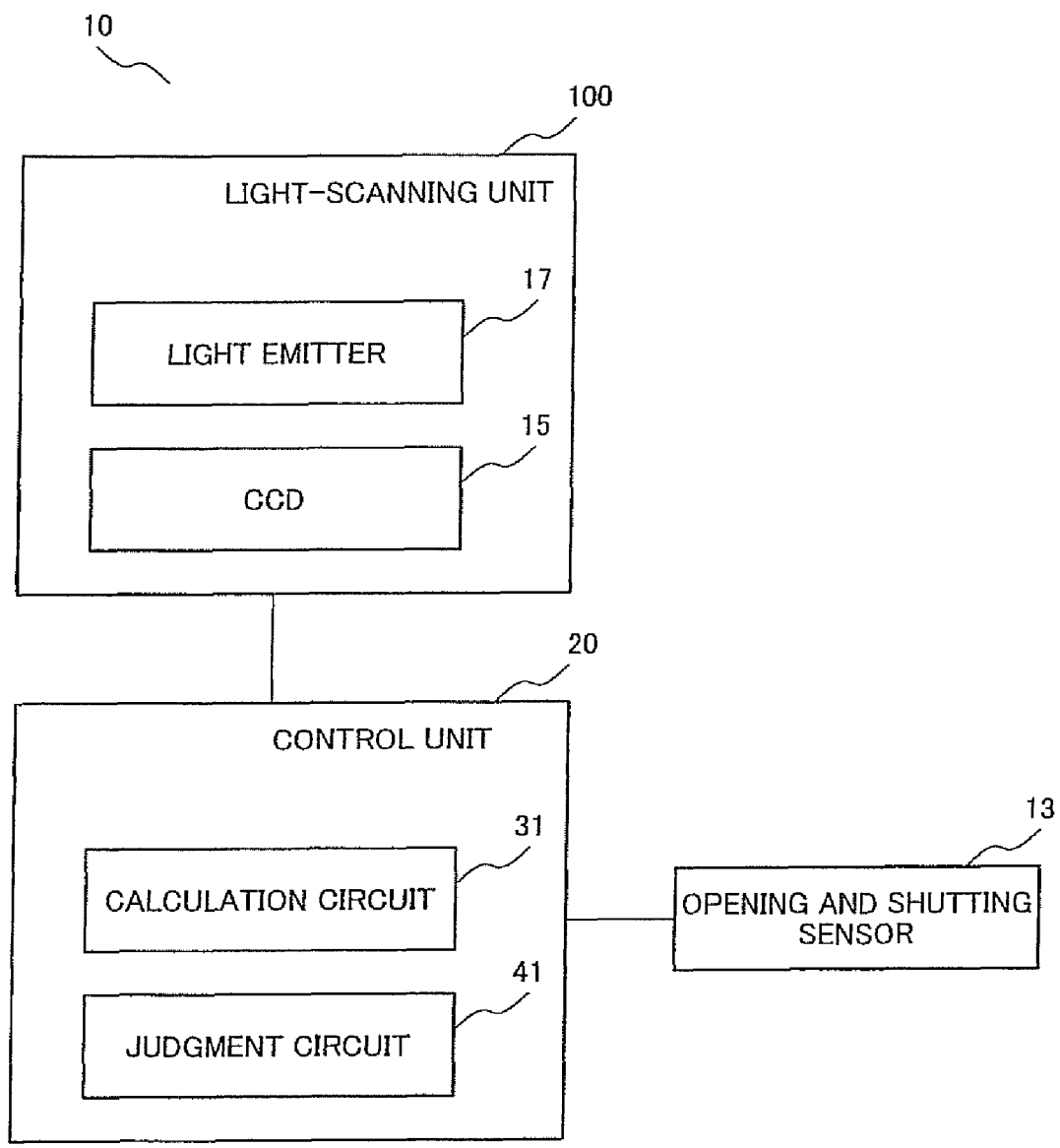
FIG. 2 is a block diagram of an image reader 10 according to a second exemplary embodiment of the present invention.
Figure 3:
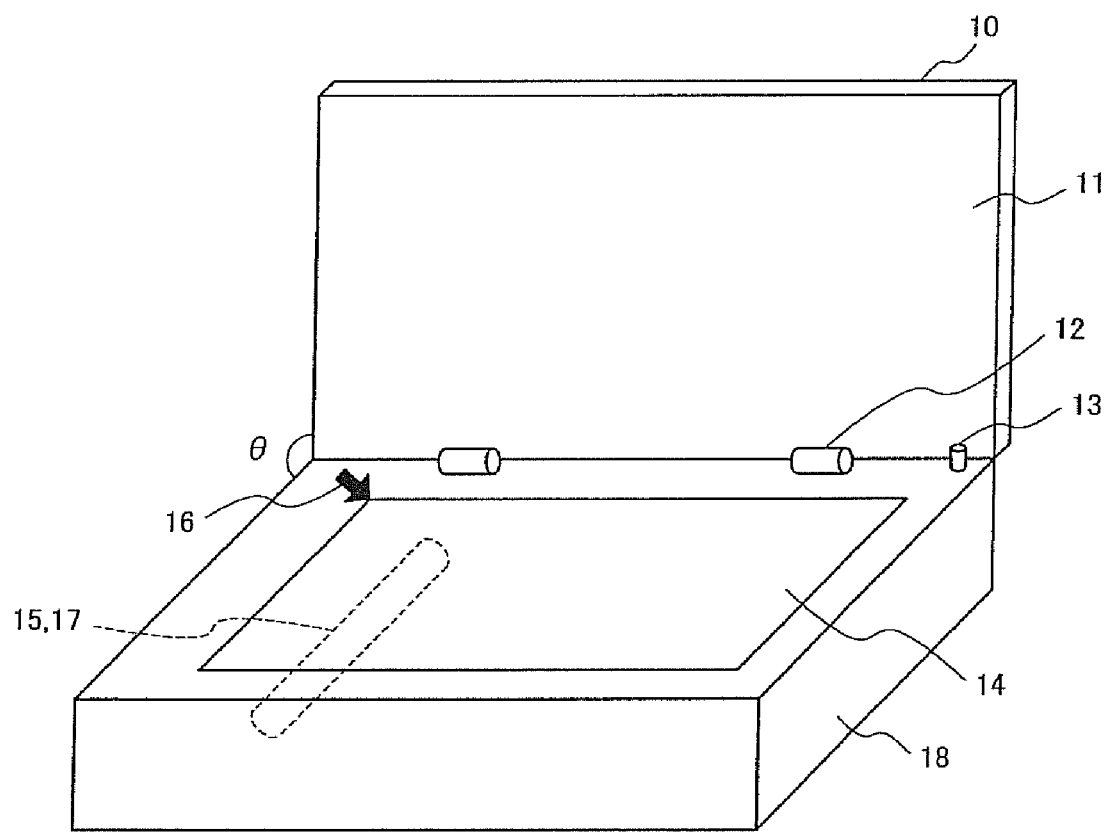
FIG. 3 is a perspective view of the image reader 10 according to the second exemplary embodiment of the present invention.

A second exemplary embodiment will be described. In the second embodiment, as an edge detecting device, an image reader 10 is applied. A block diagram of the image reader 10 according to the second embodiment is shown in FIG. 2 and an external perspective view is shown in FIG. 3. In FIG. 2, the image reader 10 includes a light scanning unit 100 and a control unit 200.

The light scanning unit 100 includes a light emitter 17 and a CCD 15. The light emitter 17 emits a linear inspection light towards an inspecting region. According to a semi-opened-state and a closed-state of a sheet cover, the CCD 15 measures a light quantity of a reflected light from the inspecting region of the inspection light, and outputs a first measurement signal and a second measurement signal as image information.

The control unit 200 includes a calculation circuit 31 and a judgment circuit 41. The calculation circuit 31 performs a predetermined calculation using the image information outputted from the CCD 15, and calculates a variation in a line direction for each pixel mentioned below. The judgment circuit 41 detects a pixel located at a sheet edge based on the variation in the line direction outputted from the calculation circuit 31.

In FIG. 3, the image reader 10 includes a device main body 18, a sheet cover 11 and an opening and closing sensor 13. The sheet cover 11 is connected to an upper face of the device main body 18 via a hinge 12 in an openable and closable manner. The opening and closing sensor 13 is provided near the hinge 12 of the upper face of the device main body 18 and detects whether or not an angle θ between the sheet cover 11 and the upper face of the device main body 18 is equal to or less than a predetermined angle α.

A glass plate 14 made of transparent member is arranged on the upper face of the device main body 18, and an arrow (hereinafter, a sheet positioning mark 16) is marked on one corner thereof. The device main body 18 includes the light emitter 17 for emitting the linear inspection light towards the glass plate 14 and the CCD 15 for measuring the reflected light from the inspecting region and for outputting image information therein. In the second embodiment, the light emitter 17 and the CCD 15 concurrently move in a longitudinal direction of the device main body 18. In the second embodiment, a usual fluorescent lamp is employed as the light emitter 17. A usual CCD having about 7000 pixels in a width direction of the glass plate 14 shown in FIG. 1 is used as the CCD 15.

When the image information of the sheet is made to be read by the above-mentioned image reader 10, a user opens the sheet cover 11 and places the sheet on the glass plate 14 so that a corner of the sheet is placed on the corner of the glass plate 14 which the sheet positioning mark 16 points. After closing the sheet cover 11 and fixing the sheet, the user presses a start button. Then, the light emitter 17 and the CCD 15 operate, the light emitter 17 emits the inspection light, and the CCD 15 measures the reflected light and outputs image information for every pixel.

Figure 4A:
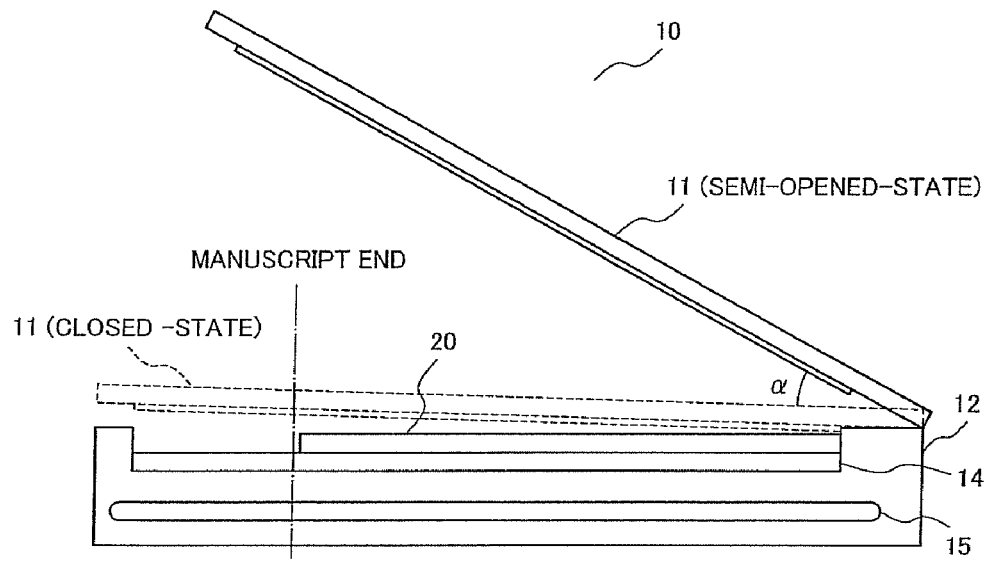
FIG. 4A is a side view of the image reader 10 according to the second exemplary embodiment of the present invention.

An edge detection method for detecting a position of a sheet edge by the image reader 10 will be described using FIG. 4A, FIG. 4B, FIG. 5A, FIG. 5B and FIG. 6. FIG. 4A is a side view of the image reader 10 when a sheet 20 is set on the glass plate 14 thereof. In FIG. 4A, a state in which the sheet cover 11 is not completely closed is a semi-opened-state and a state in which the sheet cover 11 is closed completely is a closed-state.

In the second embodiment, the opening and closing sensor 13 detects the state in which the angle θ between the sheet cover 11 and the glass plate 14 becomes a predetermined angle α as the semi-opened-state and detects the state in which the angle θ is equal to or less than the predetermined angle α as the closed-state.

Figure 4B:
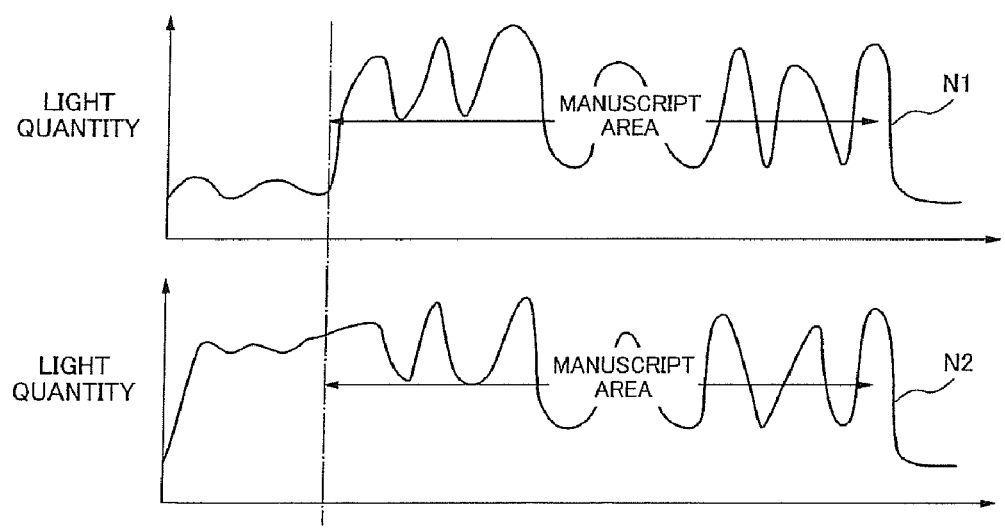
FIG. 4B is an example of image information outputted from a CCD 15 of the image reader 10 according to the second exemplary embodiment of the present invention.

FIG. 4B shows distribution of light quantity of the reflected light detected by the CCD 15 in the semi-opened-state and the closed-state. Distribution N1 of the light quantity of the reflected light from the inspecting area in the semi-opened-state is compared with distribution N2 of light quantity of the reflected light from the inspecting area in the closed-state. Then, in the area where the sheet 20 is not arranged, the light quantity detected by the CCD 15 largely changes between the semi-opened-state and the closed-state. Meanwhile, in the area where the sheet 20 is arranged, the light quantity detected by the CCD 15 hardly change between the semi-opened-state and the closed-state. The reason is that the inspection light is reflected by the sheet 20 in both the closed-state and the semi-opened-state in the area where the sheet 20 is arranged, on the other hand, in the area where the sheet 20 is not arranged, the inspection light is reflected by the sheet cover 11 and is measured by the CCD 15 in the closed-state and the inspection light passes and is not measured by the CCD 15 in the semi-opened-state.

Figure 5A:
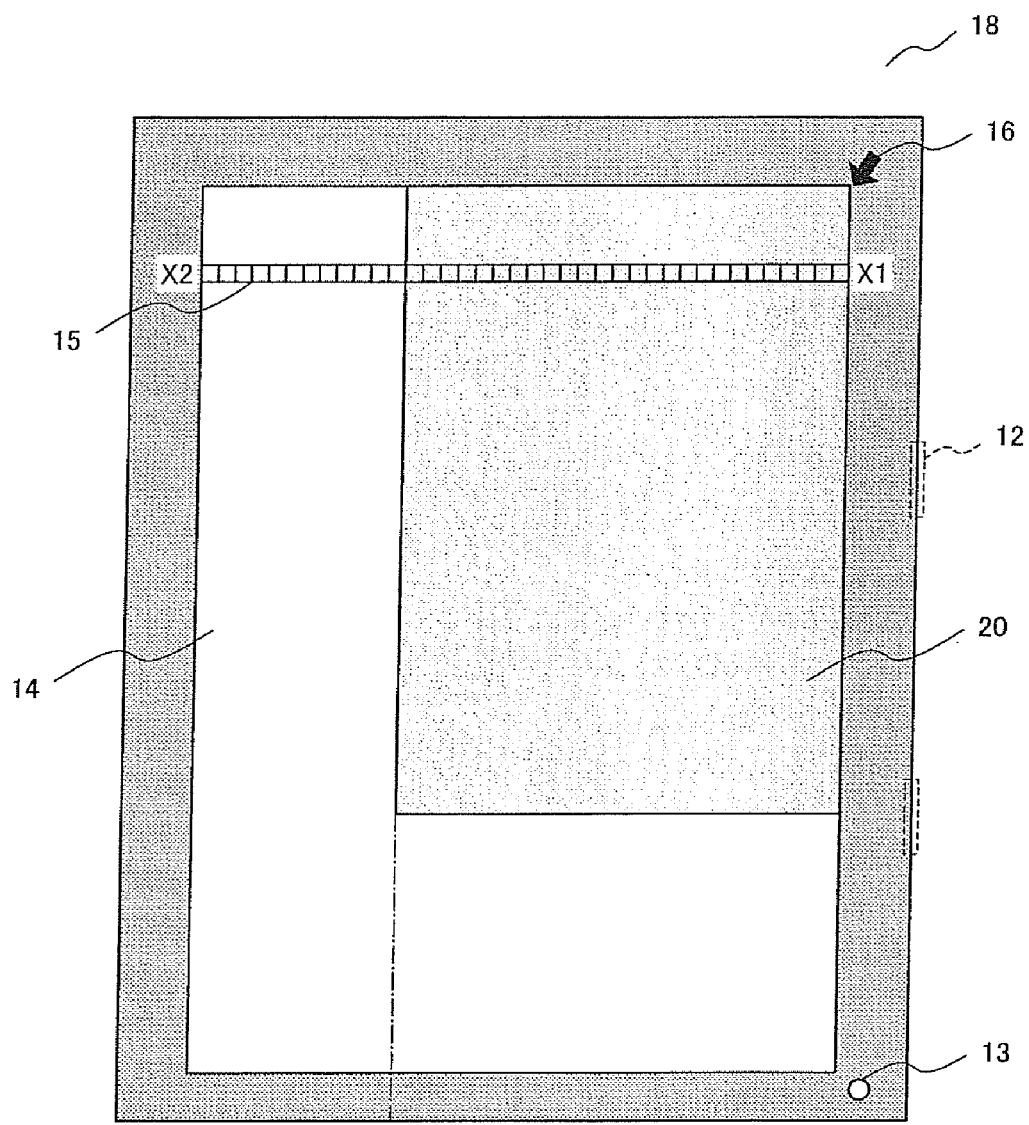
FIG. 5A is a top view of a device main body 18 of the image reader 10 according to the second exemplary embodiment of the present invention.

The detection procedure of the sheet edge will be described more in detail using FIG. 5A and FIG. 5B. FIG. 5A is a top view of the device main body 18 shown in FIG. 3. In FIG. 5A, the hinge 12 is located on the right side. The CCD 15 measures the light quantity of the light reflected from the inspecting region arranged in a horizontal direction of FIG. 5A. The CCD 15 moves from an upper side to a lower side in FIG. 5A, and outputs image information about all pixels within the glass plate 14. In any of the following description, an edge detection procedure in one linear inspecting area is described.

When a user has image information of the sheet 20 read in the image reader 10, the user places the sheet 20 on the glass plate 14 of the device main body 18.

When the opening and closing sensor 13 of the image reader 10 detects that the angle θ between the sheet cover 11 and the device main body 18 becomes the angle α, the CCD 15 measures the reflected light from the inspecting region and outputs image information of the semi-opened-state. Moreover, when the opening and closing sensor 13 detects that the angle θ becomes below the angle α, the CCD 15 outputs image information of the closed-state.

Figure 5B:
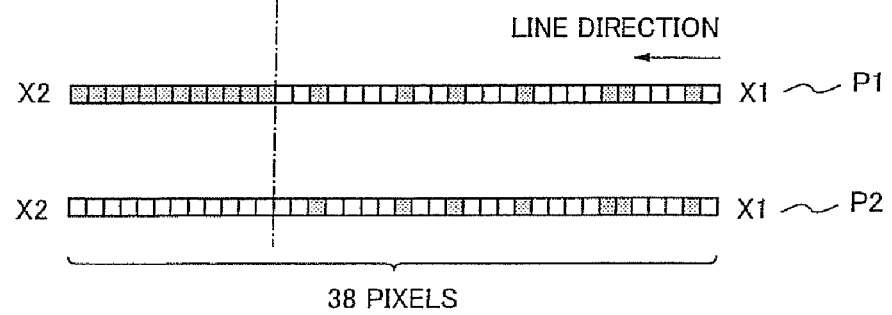
FIG. 5B shows an example of an information binarized to a pixel unit about image information outputted from a CCD 15 of the image reader 10 concerning according to the second exemplary embodiment of the present invention.

The image information outputted by the CCD 15 is shown in FIG. 5B. In FIG. 5B, P1 is the image information of the semi-opened-state, and P2 is the image information of the closed-state. Here, an end side on which the sheet 20 is set in the inspecting area (a hinge 12 side) is defined as an X1 end, an opposite end side is defined as an X2 end, and a direction from the X1 end to the X2 end is defined as a line direction. In FIG. 5B, the image information is expressed by a black area when the light quantity for each pixel measured by the CCD 15 is smaller than a predetermined threshold value, and the image information is expressed by a white area when the light quantity for each pixel measured by the CCD 15 is larger than a predetermined threshold.

In following descriptions, in order to describe the embodiment in an understood manner, a case is exemplified that the CCD 15 outputs image information for 38 pixels in the inspecting area. In FIG. 5B, although the image information of the area on which the sheet 20 is arranged (area for 26 pixels from the X1 end) does not change between the semi-opened-state and the closed-state, the image information of the area on which the sheet 20 is not arranged (area for 12 pixels from the X2 end) becomes inverted between the semi-opened-state and the closed-state.

Figure 6:
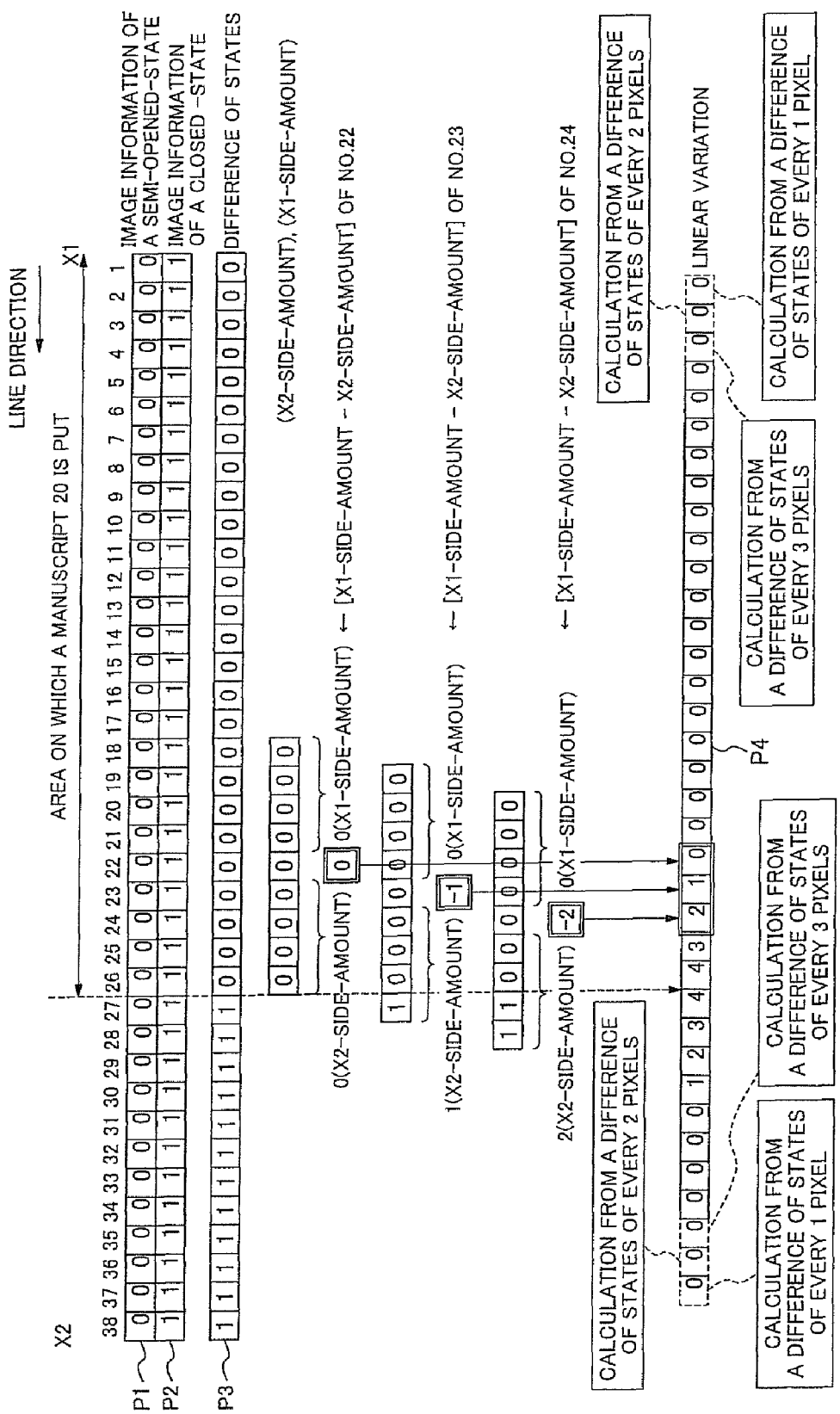
FIG. 6 is a diagram showing an edge detection procedure of the image reader 10 according to the second exemplary embodiment of the present invention.

Next, a procedure for detecting a position of the sheet edge of the sheet 20 based on the image information will be described using FIG. 6. In FIG. 6, P1 is the same as P1 of FIG. 5B and shows image information for 38 pixels in the semi-opened-state, and P2 is the same as P2 of FIG. 5B and shows image information for 38 pixels in the closed-state. Here, in FIG. 6, X1 end is arranged on a right side and X2 end is arranged on a left side, a direction from the X1 end to the X2 end is defined as a line direction. Each pixel is numbered in order, a pixel which is located at the nearest position from the X1 end is set as No. 1, and a pixel which is located at the nearest position from the X2 end is set as No. 38.

In the second embodiment, the control unit 200 of the image reader 10 (FIG. 2) changes light quantity of the reflected light for each pixel measured by the CCD 15 into binary image information according to the light quantity thereof. That is, the control unit 200 changes the image information into "0" when the light quantity of the reflected light for each pixel is smaller than the predetermined threshold (black area). The control unit 200 changes the image information into "1" when the light quantity of the reflected light for each pixel is larger than the predetermined threshold (white area).

Next, the calculation circuit 31 of the control unit 200 subtracts image information (0 or 1) of the semi-opened-state from image information (0 or 1) of the closed-state for each pixel (objective dot) for each pixel, and obtains a difference of states for each pixel. The difference of states calculated for each pixel is shown as P3. Here, the difference of states is "0" in the area where the sheet 20 is arranged, and is "1" in the area where the sheet 20 is not arranged.

Next, the calculation circuit 31 calculates first total differences of states for each pixel as an X1-side-amount by totaling the differences of states of 4 pixels adjacent to the objective dot on the X1 end side (in one direction). The calculation circuit 31 further calculates second total differences of states for each pixel as an X2-side-amount by totaling the differences of states of 4 pixels adjacent to the objective dot on the X2 end side (in the other direction). The calculation circuit 31 subtracts the X2-side-amount (second total differences) from the X1-side-amount (first total differences) for each pixel, and outputs an absolute value of the difference as a linear variation, P4 in FIG. 6.

For example, in a pixel (objective dot) of No. 22 of FIG. 6, the X1-side-amount regarding differences of states of the pixels of Nos. 18-21 is "0", and the X2-side-amount regarding differences of states of the pixels of Nos. 23-26 is "0". Accordingly, the linear variation of No. 22 is "0" (0−0=0).

Similarly, because the X1-side-amount of No. 23 is "0" and the X2-side-amount thereof is "1", the linear variation of No. 23 is "1" which is the absolute value of "−1" (0−1=−1). In the second embodiment, since the linear variation is calculated from every 4 pixels on the both sides of each pixel, the absolute value of the linear variation is any one of values "0" to "4".

The calculation circuit 31 calculates the linear variation from the image information of every three pixels on each of both sides for the fourth pixels from the X1 end and the X2 end (No. 4 and No. 35). The calculation circuit 31 calculates the linear variations of No. 3 and No. 36 from the image information of every two pixels, and those of No. 2 and No. 37 from the image information of every one pixel. And the calculation circuit 31 does not calculate the linear variations of No. 1 and No. 38.

And the judgment circuit 41 receives the linear variations of all pixels, detects a pixel having the largest linear variation, and judges that a sheet edge exists at a position of the pixel.

In FIG. 6, the pixels having the largest linear variation are No. 26 and No. 27. In the second embodiment, when a plurality of pixels have the largest linear variations, the judgment circuit 41 judges that the sheet edge is located at a position of the pixel nearest to the X1 end among the pixels. That is, the judgment circuit 41 judges that the sheet edge is located in the position of No. 26.

The reason why it is judged that the sheet edge is located in the position of the pixel having the largest linear variation is described as follows. That is, the X1-side-amount is "0" because of the sheet 20 being arranged on the X1 end side (on the right side) of the objective dot. On the other hand, the X2-side-amount becomes the maximum value (in the second embodiment, "4") because of the sheet not being arranged on the X2 end side (on the left side) of the objective dot. Accordingly, the linear variation obtained by subtracting the X2-side-amount from the X1-side-amount becomes the largest for a pixel where a sheet edge is located.

Here, in the second embodiment, the calculation circuit 31 uses the image information of 38 pixels from X1 end to X2 end for calculation. However, when an area where the sheet edge does not exist is known in advance, the calculation circuit 31 may perform calculation without image information on the area. For example, when a length or a width of a sheet 20 always exceeds a half length of one line, the calculation circuit 31 may just calculate the linear variation about pixels of No. 19 to No. 38 excluding pixels of No. 1 to No. 18.

Moreover, the image information for one line in a short side direction of the glass plate 14 is used for detection of the sheet edge. However, the image information for two or more lines in the short or long side direction can also be used. If the edge is detected a by majority using the image information for two or more lines, influence by a foreign substance can be decreased even when the foreign substance adheres to the glass plate 14.

In the above-mentioned description, the CCD 15 outputs image information of 38 pixels from X1 end to X2 end, and the calculation circuit 31 calculates the linear variation using image information for every 4 pixels on both sides of each pixel. However, the number of pixels used for calculation and the like are optionally adjusted according to accuracy of sheet edge detection and the like.

Practically, the CCD 15 outputs image information of about 7000 pixel from the X1 end to the X2 end, and the calculation circuit 31 calculates a linear variation of every 32 pixels on each of both sides of each pixel. The judgment circuit 41 detects a pixel having the largest linear variation out of the 7000 pixels, and judges that the sheet edge is positioned at the position of the pixel.

The image reader 10 according to the second exemplary embodiment as mentioned above calculates the linear variation from image information of the semi-opened-state and the closed-state, and judges that the sheet edge is positioned at the position of the pixel having the largest linear variation. Because the linear variation becomes an extreme value at the sheet edge, the sheet size is detectable with high accuracy, regardless of the position of the sheet edge.

The Third Exemplary Embodiment

A third exemplary embodiment will be described. In the second exemplary embodiment, the image reader 10 judges that the pixel having the largest linear variation is located at the sheet edge. However, when the sheet shifts at the time of opening and closing of the sheet cover 11, a linear variation for a pixel where the sheet edge is not located may become the largest. Therefore, in the method of the second embodiment, it may be judged that the sheet edge is positioned on a wrong pixel.

Then, an edge detecting device for detecting a position of an edge of an object according to the third embodiment is provided with a function to judge whether or not a pixel having the largest linear variation is located at a position of a true sheet edge.

Figure 7:
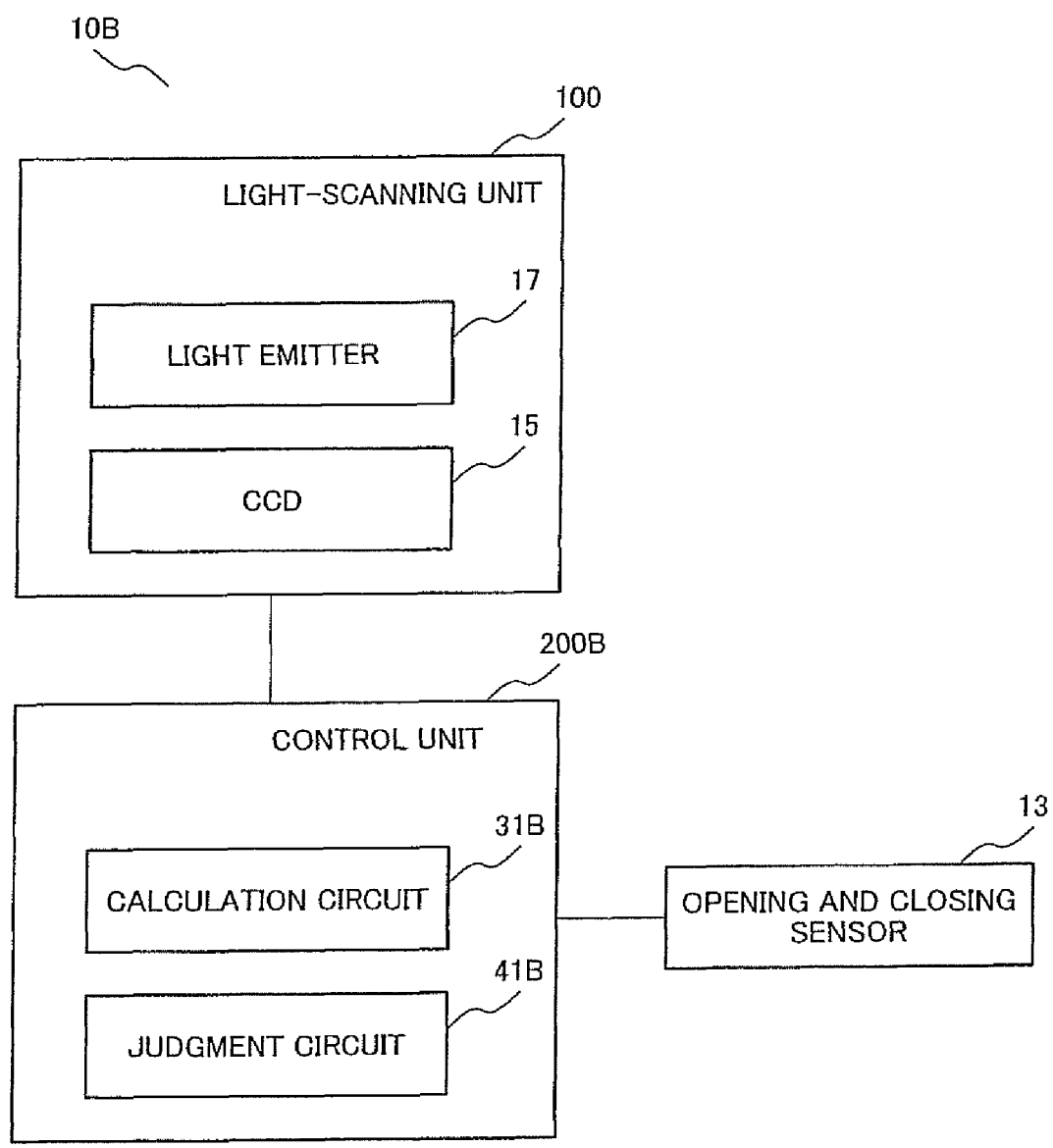
FIG. 7 is a block diagram of an image reader 10B according to a third exemplary embodiment of the present invention.

FIG. 7A shows block diagram of the image reader 10B according to the third exemplary embodiment. The image reader 10B includes a light scanning unit 100 including a light emitter 17 and a CCD 15, a control unit 200B including a calculation circuit 31B and a judgment circuit 41B, and an opening and closing sensor 13. Since a function of each circuit of the image reader 10B is similar to the function of each circuit described in the second embodiment, the detailed description thereof is omitted below.

Figure 8:
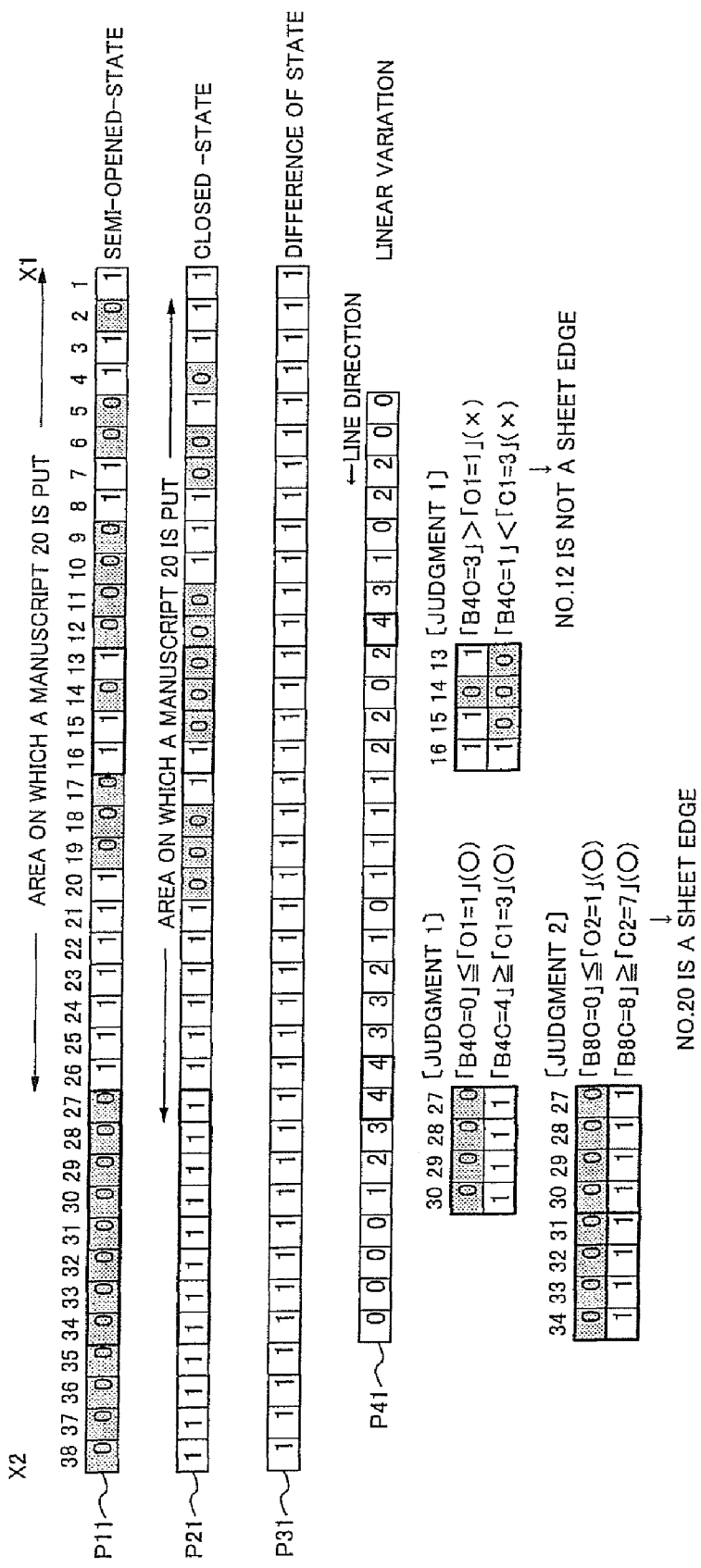
FIG. 8 is a diagram showing an edge detection procedure of an image reader 10B according to the third exemplary embodiment of the present invention.
Figure 9:
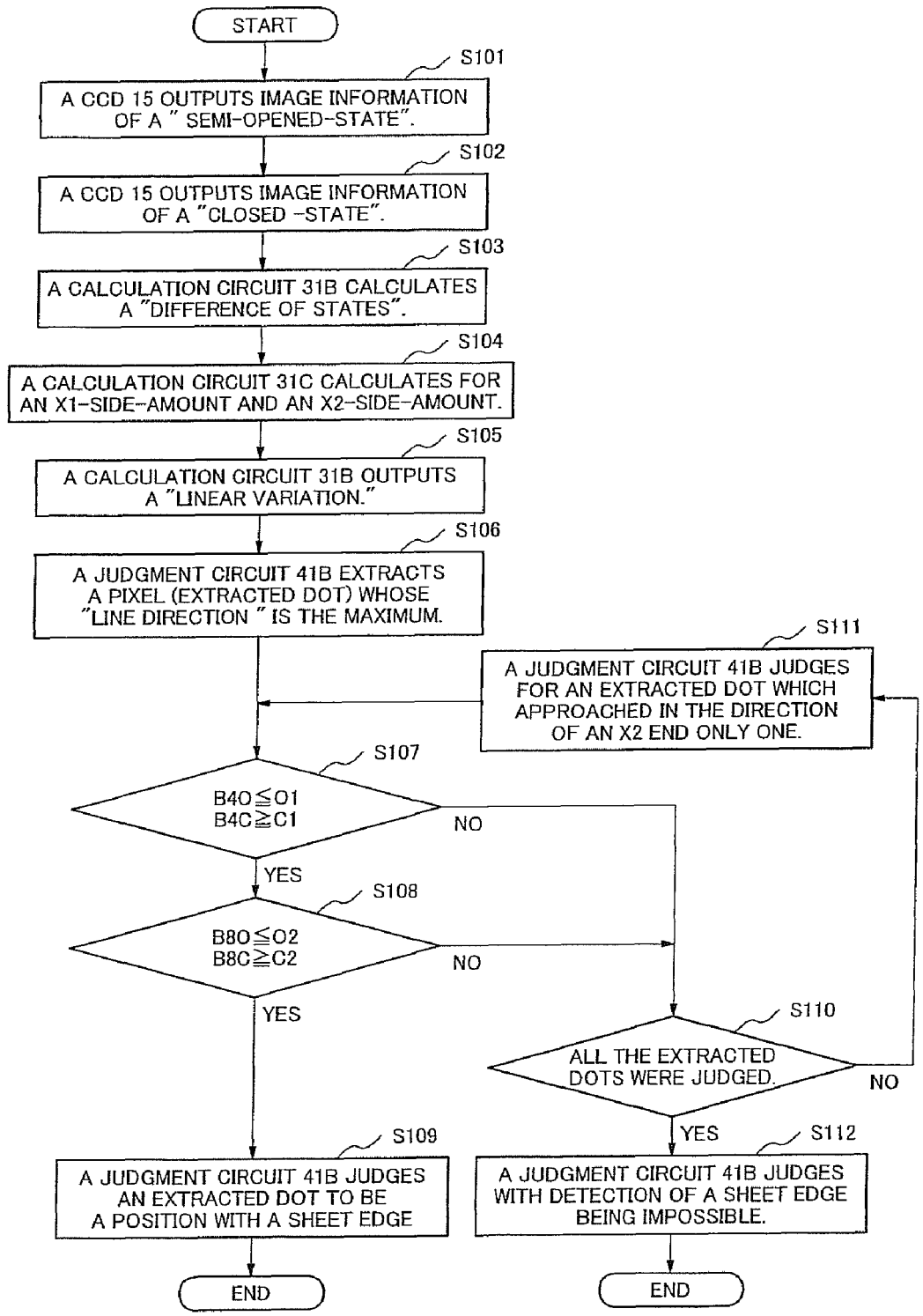
FIG. 9 is a flowchart showing an example of operation of an image reader 10B according to the third exemplary embodiment of the present invention.

An edge detection method of the image reader 10B is described using FIG. 8 and FIG. 9. The CCD 15 of the image reader 10B also detects image information on 38 pixels from an X1 end to an X2 end like the second embodiment.

In FIG. 8, the calculation circuit 31B of the image reader 10B calculates a difference of states (P31) for each objective dot by subtracting image information in a semi-opened-state (P21) from image information in a closed-state (P11). The calculation circuit 31B calculates first and second total differences by using image information of both 4 pixels adjacent to the X1 end side and the X2 end side like the second embodiment. The calculated results are an X1-side-amount (the first total differences) and an X2-side-amount (the second total differences). The calculation circuit 31B subtracts the X2-side-amount from the X1-side-amount, and outputs an absolute value of the difference as a linear variation (P41).

As shown in FIG. 8, image information of the semi-opened-state and the closed-state changes in an area where a sheet 20 is located. The reason is that the sheet shifts to the X2 end side by one or two pixels when the sheet cover 11 is closed.

In P41 of FIG. 8, objective dots having the largest linear variations are No. 12, No. 26, and No. 27. In such case, the second judgment circuit 41 of the image reader 10 of the second embodiment mentioned above erroneously judges that No. 12 is a pixel where the sheet edge located. Then, the judgment circuit 41B of the image reader 10B of the third embodiment judges whether or not an objective dot having the largest linear variation is located at a position of a true sheet edge. Hereinafter, a pixel having the largest linear variation among objective dots is described as an extracted dot.

The image reader 10B of the third embodiment uses image information of "0" or "1" in which the control unit 200B binarized light quantity of a reflected light measured by the CCD 15, in order to judge whether or not an extracted dot is a pixel which gives a position of the true sheet edge. That is, in FIG. 8, if the sheet edge is positioned at the extracted dot, the sheet does not exist on an X2 end side (left side) of the extracted dot. Accordingly, "0" continues in a semi-opened-state, and "1" continues in a closed-state in the image information of pixels on the X2 end side (the left side) of the extracted dot. So, it is possible to judge whether or not the extracted dot is located at the position of the sheet edge by using the image information of the pixels on the X2 end side (the left side) of the extracted dot.

Here, the judgment circuit 41B of the image reader 10B in the third embodiment performs the above-mentioned judgment with two steps. The judgment circuit 41B starts the judgment from the extracted dot on the X1 end side, and when the extracted dot which satisfies two conditions is detected, the judgment circuit 41B judges with the sheet edge being located at the extracted dot.

First, a first judgment will be described. In the first judgment, it is judged whether or not the total of image information of 4 pixels located on X2 end side of the extracted dot in the semi-opened-state (hereinafter, B4O) is equal to or less than threshold value O1 as a first threshold value and whether or not the total of the image information thereof in the closed-state (hereafter, B4C) is equal to or more than the threshold value C1 as a second threshold value (hereinafter, a first conditions). Then, the B4O is a total of a first light quantity and the B4C is a total of a second light quantity.

Here, if the extracted dot is located at the position of the sheet edge, B4O=0 and B4C=4 hold, respectively. Accordingly, in the third embodiment, the threshold values O1 and C1 are 1 and 3, respectively, and the threshold values are beforehand memorized in the judgment circuit 41B. That is, if "B4O≦1" and "B4C≧3" hold when the B4O and the B4C of the extracted dot are calculated, the extracted dot satisfies the first condition. The threshold value O1 and the threshold value C1 are set according to the number of pixels used for judgment (in the third embodiment, four pixels). For example, the threshold values O1 and C1 may be 4 and 12 respectively, when the number of pixels used for judgment is 16 pixels.

The judgment circuit 41B further performs a second judgment about the extracted dot which satisfies the first condition. In the second judgment, the same judgment as the first judgment is performed about 8 pixels adjacent to the X2 end side of the extracted dot. That is, in the second judgment, it is judged about 8 pixels adjacent to the X2 end side of the extracted dot whether the total of image information thereof in the semi-opened-state (B8O) is equal to or less than the threshold value O2, and the total of image information thereof in the closed-state (B8C) is equal to or more than the threshold value C2 (hereinafter, a second condition). If the extracted dot is located at the sheet edge, B8O=0 and B8C=8 respectively. Therefore, in the third embodiment, the threshold value O2 and the threshold value C2 are set as 1 and 7 respectively, and the values are memorized in the judgment circuit 41B. That is, when the B8O and the B8C of the extracted dot are calculated, the extracted dot satisfies the second condition if B8O≦1 and B8C≧7.

The judgment thereof is specifically described according to FIG. 8. In FIG. 8, the extracted dots having the largest linear variations are the pixels No. 12, No. 26 and No. 27. First, the judgment circuit 41B performs the first judgment about the No. 12 pixel which is located at the nearest position to the X1 end. The B4O of No. 12 (total of image information of No. 13 to No. 16 in a semi-opened-state) is "3", and the B4C (total of the image information of four pixels in the closed-state) is "1". Since the B4O is larger than the threshold value O1 (O1=1), and the B4C is smaller than the threshold value C1 (C1=3), No. 12 does not satisfy the first condition. Accordingly, the judgment circuit 41B judges that the No. 12 pixel is not located at the position of the sheet edge.

Next, the judgment circuit 41B performs the first judgment about the No. 26 pixel which is located at the second nearest position to the X1 end. With respect to No. 26 pixel, B4O=0, B4O is smaller than the threshold value O1 (O1=1), and the B4C=4, B4C is larger than the threshold value C1 (C1=3). Accordingly, the No. 26 pixel satisfies the first condition. The judgment circuit 41B further performs a second judgment about the No. 26 pixel. B8O of the No. 26 pixel is "0" and is smaller than the threshold value O2 (O2=1), and B8C is "8" and is larger than the threshold value C2 (C2=7). Accordingly, the No. 26 pixel also satisfies the second condition.

In the third embodiment, when an extracted dot which is nearest to the X1 end and satisfies the first and the second conditions is detected, the judgment circuit 41B judges the sheet edge is located at the extracted dot. That is, the judgment circuit 41B judges the sheet edge is located at the No. 26 pixel.

The above-mentioned procedure is shown in FIG. 9. When the opening and closing sensor 13 detects the semi-opened-state, the CCD 15 detects a reflected light in the semi-opened-state, and outputs image information (S101). When the opening and closing sensor 13 detects the closed-state, the CCD 15 outputs image information of the closed-state (S102).

The calculation circuit 31B of the image reader 10B calculates a difference of states from the image information in the semi-opened-state and the image information of the closed-state for each objective dot (S103). The calculation circuit 31B calculates an X1-side-amount and an X2-side-amount for each objective dot (S104), and outputs an absolute value of a difference between the X1-side-amount and the X2-side-amount as a linear variation (S105).

After the calculation circuit 31B outputs the linear variations about all the objective dots, the judgment circuit 41B extracts a pixel (extracted dot) which gives the largest linear variation (S106).

And the judgment circuit 41B of the image reader 10B judges whether or not the extracted dot is located at a true sheet edge in order from the extracted dot which is the nearest to the X1 end. First, the judgment circuit 41B performs the first judgment about the extracted dot. That is, the calculation circuit 31B calculates and outputs B4O and B4C of the extracted dot. The judgment circuit 41B judges whether or not B4O is equal to or less than the threshold value O1, and B4C is equal to or more than the threshold value C1 (S107). When the extracted dot satisfies the first condition, the judgment circuit 41B further performs the second judgment about the extracted dot. That is, the calculation circuit 31B outputs B4O and B4C of the extracted dot, and the judgment circuit 41B judges whether or not B8O is equal to or less than the threshold value O2, and whether or not B8C is equal to or more than the threshold value C2 (S108). When the second condition is also satisfied, it is judged that the sheet edge is located at the extracted dot (S109).

On the other hand, when the extracted dot does not satisfy the first condition or the second condition (NO of S107 or S108), the judgment circuit 41B performs the same judgment about the extracted dot which is the next nearest to the X1 end (NO of S110, S111). On the other hand, when the extracted dot which satisfies both the first condition and the second condition is not obtained after judgment about all the extracted dots (YES of S110), the judgment circuit 41B judges that the sheet edge detection is impossible (S112), and requires a user to specify sheet size.

Although only the pixel having the largest linear variation is the extracted dot in the third embodiment, a different way is possible. For example, a pixel having the second largest linear variation can be included in the extracted dot, and the first and the second judgment can also be performed about such extracted dot. A predetermined number of pixels having large linear variation in order from the pixel having the largest linear variation can also be includes in the extracted dot.

Here, in order to simply detect the sheet edge, the second judgment can be omitted and only the first judgment may be performed. Since the CCD 15 includes high resolving power, the first judgment can just avoid false detection of the sheet edge to some extent.

In the above description, the CCD 15 outputs image information for 38 pixels from the X1 end to the X2 end and the calculation circuit 31B outputs a linear variation for each pixel from image information of every continuous 4 pixels adjacent to both sides of each pixel. The judgment circuit 41B uses image information (4 pixels and 8 pixels) adjacent to X2 end side of the extracted dot for the first and the second judgment.

Actually, it is desirable to perform following analyses. That is, the calculation circuit 31B calculates a linear variation of every 32 pixels adjacent to both sides of each of about 7000 pixels from the X1 end to the X2 end. And the judgment circuit 41B extracts a pixel having the largest linear variation out of the 7000 pixels. The judgment circuit 41B uses a total of image information on the X2 end side of 32 pixels and 128 pixels which is adjacent to the X2 end side of the extracted dot for the first and the second judgment respectively. However, an amount of pixel information to detect, and the number of pixels used for the judgment are not limited to the above mentioned value. The values may be optionally set according to detecting accuracy of the sheet edge, reading accuracy of the CCD 15, and the like.

In the third exemplary embodiment, the image reader 10B narrows down the extracted dot having high possibility of the sheet edge using the first judgment with a low calculation load, and finally judges whether or not the extracted dot is located at a position of the true sheet edge with respect to the narrowed-down extracted dot using the high-accuracy second judgment. Accordingly, the image reader 10B can perform highly accurate sheet edge detection by a minimum necessary load.

The Fourth Exemplary Embodiment

Figure 10:
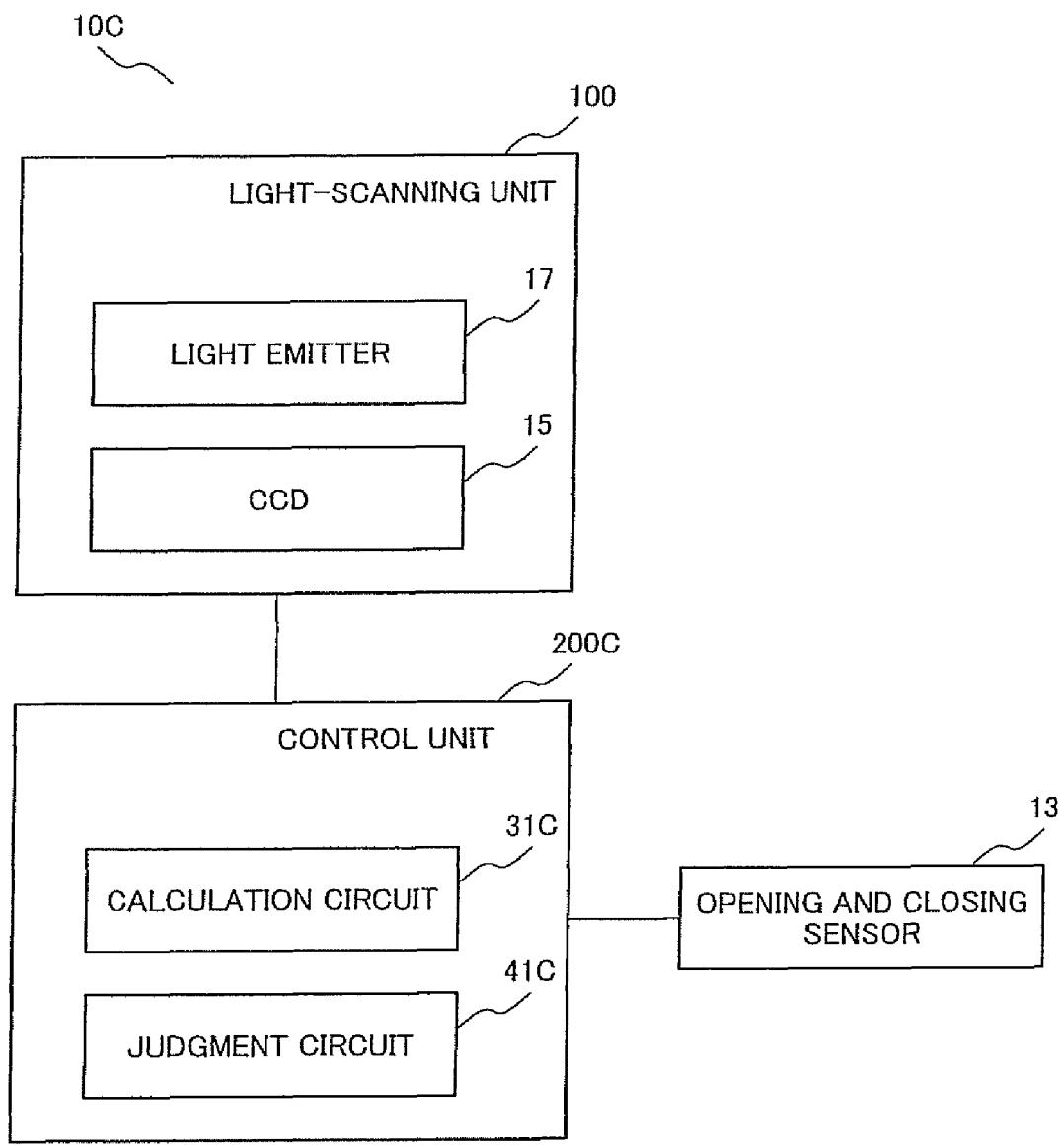
FIG. 10 is a block diagram of an image reader 10C according to a fourth exemplary embodiment of the present invention.

Next, a fourth exemplary embodiment will be described. A block diagram of an image reader 10C according to the fourth exemplary embodiment is shown in FIG. 10. The image reader 10C includes a light scanning unit 100 having a light emitter 17 and a CCD 15, a control unit 200C having a calculation circuit 31C and a judgment circuit 41C, and an opening and closing sensor 13. Since functions of each circuit of the image reader 10C are similar to the functions of each circuit of the image readers 10B and 10C described in the second and the third embodiment, detailed descriptions will be omitted. In the fourth embodiment, an end on a side where a sheet 20 is arranged in an inspecting region is defined as an X1 end and the opposite end thereof is defined as an X2 end, and a direction to the X2 end from the X1 end is defined as a line direction.

The image reader 10C according to the fourth embodiment judges whether or not a pixel is located at a position of a sheet edge in order from the X1 end side for each pixel of all the pixels (about 7000 pixels). Hereinafter, a pixel which is judged whether or not the pixel is located at a position of the sheet edge is described as an objective dot. When the objective dot satisfies following four conditions, the image reader 10C judges that the sheet edge is located at a position of the objective dot.

A first condition is almost equal to the first condition described in the third embodiment. That is, it is judged that whether or not a total of image information in a semi-opened-state of 32 pixels adjacent to an X2 end side of the objective dot (hereafter, B32O) is smaller than the threshold value O3 as a first threshold value, and whether or not a total of image information in a closed-state thereof (hereafter, B32C) is larger than the threshold value C3 as a second threshold value. Here, in the fourth embodiment, the same judgment as the objective dot is also performed with respect to 128 pixels which are adjacent to the X2 end side of the objective dot. Hereinafter, the 128 pixels adjacent to the X2 end side of the objective dot are described as all the reference pixels, and in particular a pixel that is actually judged among all the reference pixels is described as a reference pixel.

The calculation circuit 31C calculates B32O and B32C respectively about the objective dot and all the reference pixels. The judgment circuit 41C judges as a first judgment whether or not B32O is smaller than the threshold value O3, and whether or not B32C is smaller than the threshold value C3 about calculating results for each of 129 pixels.

Next, a second condition will be described. In the second condition, when the objective dot is located at a position of the sheet edge, it is available that the sheet does not exist in the X1 end side of all the reference pixels. When the objective dot is located at the position of the sheet edge, image information of all the reference pixels are "0" in a semi-opened-state and "1" in a closed-state excluding a part of pixels. Accordingly, the total of the image information for 32 pixels on the X1 end side of all the reference pixels in the semi-opened-state (hereinafter, A32O) is "0" and the total of the image information for the same in the closed-state (hereinafter, A32C) is "32".

Accordingly, the judgment circuit 41C judges as a second judgment whether or not A32O is smaller than the threshold value O4 and whether or not A32C is larger than the threshold value C4.

Here, the sheet exists on a part of 32 pixels adjacent to X2 end side of the sheet edge, in X1 end side. Accordingly, the image reader 10C judges that the sheet edge is located at a pixel which approaches X2 end by several pixels from an actual sheet edge by applying the second condition. However, when size of the sheet 20 is determined, it is substantially uninfluential that an edge position of the sheet 20 which is judged is different by several pixels.

A third condition will be described. In the third judgment, the calculation circuit 31C calculates a total of B32O of the objective dot and B32O of all the 128 reference pixels, that is, a total of B32O of the 129 pixels, (hereinafter, TB32O). The calculation circuit 31C calculates a total of B32C of the objective dot and B32C of all the 128 reference pixels, that is, a total of B32C of the 129 pixels, (hereinafter, TB32C). Then, B32O is a grand total of a total of first light quantity and B32C is a grand total of a total of second light quantity.

If the objective dot is located at a position of the sheet edge, TB32O is "0" and TB32C is "4128" (=32×129). The judgment circuit 41C judges whether or not TB32O is smaller than the threshold value O5 as a third threshold value, and whether or not TB32C is larger than the threshold value C5 as a fourth threshold value.

Next, in a fourth condition, it is available that a linear variation of the objective dot becomes a maximum value, when the objective dot is located at the position of the sheet edge. In the fourth embodiment, the calculation circuit 31C calculates the linear variation which is an absolute value of a difference between the X2-side-amount for the 32 pixels and the X1-side-amount for the 32 pixels. The judgment circuit 41C judges whether or not the linear variation of the objective dot is larger than the threshold value Z as the fourth judgment. When the objective dot is located at the position of the sheet edge, the linear variation of the objective dot is "32". In the fourth embodiment, the threshold value Z is "30" and is stored in the judgment circuit 41C beforehand. When the objective dot satisfies the first to the fourth conditions, the judgment circuit 41C judges that the objective dot at that time is located at the position of the sheet edge.

Here, each threshold value can be optionally set according to detecting accuracy of the sheet edge based on the above-mentioned descriptions. When the threshold values are set loosely, it becomes highly probable that the image reader 10C erroneously detects the position of the sheet edge. On the other hand, when the threshold value is set severely, it becomes highly probable that the image reader 10C judges detection of the sheet edge is impossible.

Figure 11:
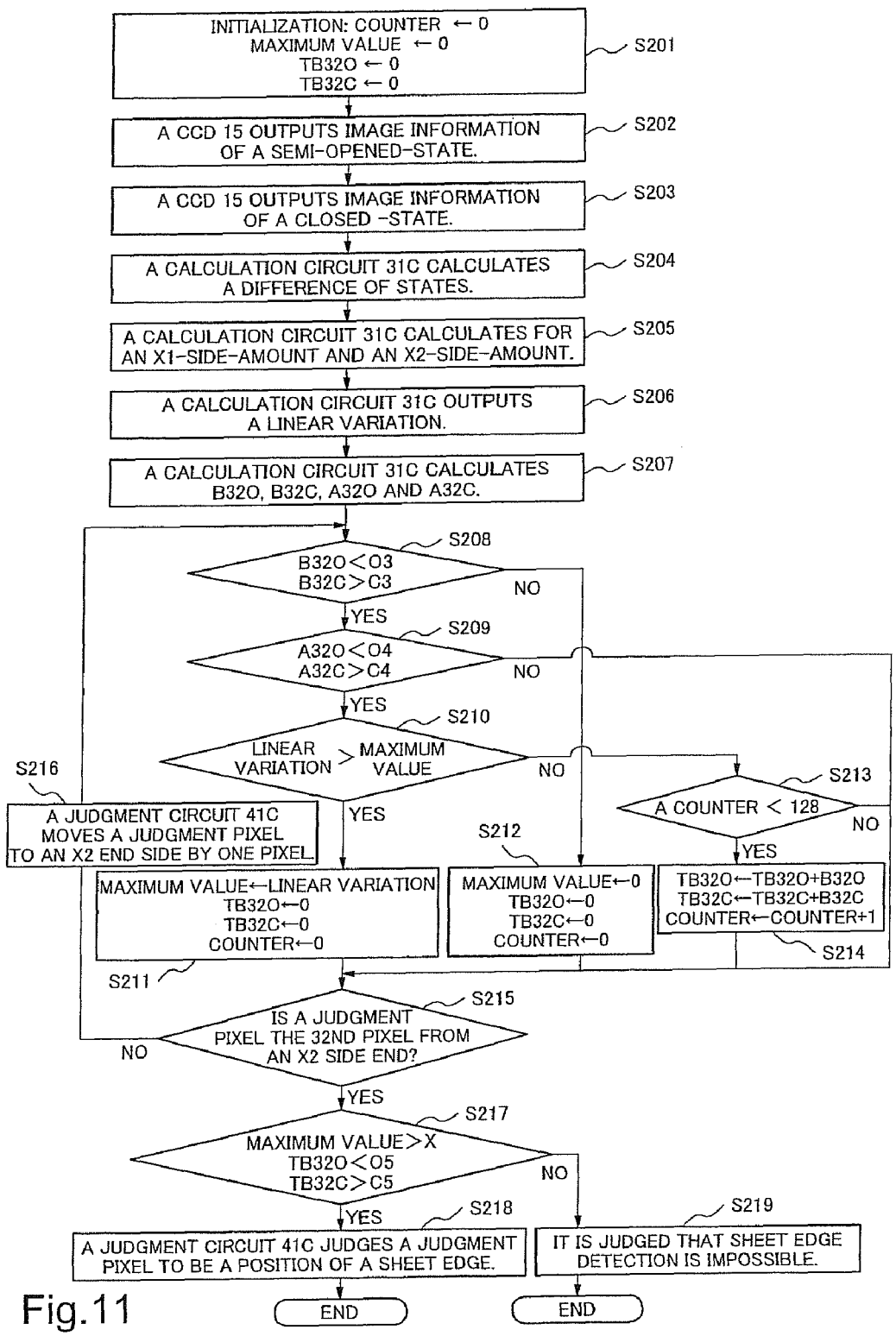
FIG. 11 is a flowchart showing an example of operation of an image reader 10C according to the fourth exemplary embodiment of the present invention.

An above-mentioned procedure is shown in FIG. 11. In FIG. 11, first the image reader 10C initializes each variable (S201). Here, a "counter" is a variable for counting 128 pixels from the objective dots. A linear variation of the objective dot is substituted for the maximum value. As TB32O and TB32C, TB32O and TB32C used in the third judgment are substituted, respectively. "0" is substituted for any variable by the initialization.

In the state, the opening and closing sensor 13 detects the semi-opened-state of the sheet cover 11, and the CCD 15 outputs image information of the semi-opened-state (S202). The opening and closing sensor 13 detects the closed-state of the sheet cover and the CCD 15 outputs pixel information of the closed-state (S203). And the calculation circuit 31C calculates a difference of states by subtracting the image information of the semi-opened-state from the image information of the closed-state (S204).

The calculation circuit 31C calculates total differences of states for 32 pixels adjacent to the X2 end side (second total differences), that is, an X2-side-amount, and calculates total differences of states for 32 pixels adjacent to the X1 end side (first total differences), that is, an X1-side-amount, with respect to all the pixels (except for each of 32 pixels on both edges) (S205). And the calculation circuit 31C outputs an absolute value of a difference between the X2-side-amount and the X1-side-amount as a linear variation (S206).

The calculation circuit 31C obtains A32O and A32C by totaling the image information of 32 pixels adjacent to the X1 end side in the semi-opened-state and the opened state and obtains B32O and B32C by totaling the image information of 32 pixels adjacent to the X2 end side in the semi-opened-state and the opened state (S207).

After that, the image reader 10C of the fourth embodiment judges in order whether or not a pixel is located at a position of the sheet edge for each pixel of pixels from the 33rd pixel from the X1 end to the 33rd pixel from the X2 end.

First, the judgment circuit 41C selects the 33rd pixel from the X1 end as an objective dot, and judges whether or not B32O of the objective dot is smaller than O3 and B32C thereof is larger than C3, that is, whether or not the objective dot satisfies the first condition (S208). When the 33rd pixel from the X1 end does not satisfy the first condition ("NO" of S208), the judgment circuit 41C newly selects the 34th pixel from the X1 end as an objective dot and judges whether or not the first conditions is satisfied similarly.

Hereinafter, a case where the m-th pixel from the X1 end satisfies the first condition is described. When the m-th pixel from X1 end satisfies the first condition ("YES" of S208), the judgment circuit 41C judges further whether or not the objective dot, that is, the m-th pixel satisfies the second condition. That is, the judgment circuit 41C judges whether or not A32O of the m-th pixel is smaller than O4 and A32C thereof is larger than C4 (S209). When the m-th pixel also satisfies the second condition ("YES" of S209), the judgment circuit 41C judges whether or not a linear variation of the m-th pixel is the largest in linear variation of pixels from the m-th pixel to a pixel of X1 end side (S210). When the linear variation of the m-th pixel is the largest ("YES" of S210), the judgment circuit 41C substitutes the linear variation of the m-th pixel for the maximum value, and resets TB32O, TB32C and the counter.

When the m-th pixel is not the 32nd pixel from the X2 end ("NO" of S215), the judgment circuit 41C selects a pixel next to the m-th pixel toward X2 end side, that is, the m+1th pixel, as a first reference pixel (S216), and judges whether or not the reference pixel satisfies the first condition and the second condition.

When the reference pixel (the m+1th pixel) does not satisfy the first condition ("NO" of S208), the judgment circuit 41C judges that the sheet is located at a position of the reference pixel, that is, the objective dot is not located at the sheet edge. The judgment circuit 41C resets a variable (S212), changes the objective dot (the m-th pixel) to a pixel (the m+1th pixel) neighboring the X2 end side thereof and returns to S208 ("NO" of S215 and S216).

When the reference pixel (the m+1th pixel) satisfies the first condition but does not satisfy the second condition ("NO" of S209), the judgment circuit 41C maintains the objective dot as it is, and shifts the reference pixel to the X2 end side by one pixel. That is, the judgment circuit 41C newly selects the m+2th pixel as a reference pixel (S216), and repeats the judgments after the S208 about the reference pixel (the m+2th pixel).

When the reference pixel (the m+1th pixel), on the other hand, satisfies the first condition and the second condition ("YES" of S209), the judgment circuit 41C compares the linear variation of the reference pixel with an amount of the linear variation of the objective dot (the m-th pixel) which is substituted for the maximum value at that time (S210). When the linear variation of the reference pixel (the m+1th pixel) is larger than the linear variation of the objective dot (the m-th pixel) ("YES" of S210), the judgment circuit 41C selects the reference pixel (the m+1th pixel) as a new objective dot.

The judgment circuit 41C substitutes the linear variation of the new objective dot (the m+1th pixel) for the maximum value, and resets the value of TB32O, TB32C, and the counter, respectively (S211). The judgment circuit 41C selects a pixel (the m+2th pixel) neighboring the X2 end side of the new objective dot (the m+1th pixel) as a reference pixel (S216), and performs the judgments after the S208.

On the other hand, when "NO" occurs in S210, the judgment circuit 41C maintains the objective dot (the m-th pixel)

at that time just as it is. The judgment circuit 41C judges whether or not the counter is smaller than 128 (S213). When the counter is smaller than 128 ("YES" of S213), the judgment circuit 41C increments a value of the counter by one, and adds values of B32O and B32C of the reference pixel (the m+1th pixel) to the TB32O and the TB32C, respectively (S214). The judgment circuit 41C shifts the reference pixel to the X2 end side by one pixel (S216), and performs similar investigation on the new reference pixel (the m+2th pixel).

Because it is confirmed that 128 reference pixels satisfy the first and the second condition about the objective dot (the m-th pixel) when the counter is 128 or more ("NO" of S213), the judgment circuit 41C maintains TB32O and TB32C at that time, and further performs judgment of whether or not all reference pixels on X2 end side satisfy the first condition.

When the objective dot or the reference pixel is the 32nd pixel from the X2 end ("YES" of S215), the judgment circuit 41C judges whether or not TB32O and TB32C at that time are smaller than the threshold value O5 and larger than the threshold value C5. The judgment circuit 41C judges whether or not the linear variation of the objective dot at that time is larger than the threshold value X (S217).

And when the objective dot and all the objective dots satisfy the third and the fourth condition ("YES" of S217), the judgment circuit 41C judges the objective dot at that time to be the position of the sheet edge (S218). On the other hand, when the objective dot and all the objective dots do not satisfy the third or fourth condition at the time ("NO" of S217), the judgment circuit 41C judges that sheet edge detection is impossible, and requires a user to specify a sheet size (S219).

As mentioned above, in the fourth exemplary embodiment, the judgment circuit 41C judges whether or not the first to fourth conditions are satisfied about all the pixels of one line, and judges the objective dot is located at the position of the sheet edge when all judgment on one line is completed and an objective dot satisfying the first to fourth conditions is detected.

The judgment circuit 41C judges not only the objective dot but A32O, A32C, B32O, and B32C of the reference pixels for 128 pixels in the first to third judgment of the fourth embodiment. Therefore, the image reader 10C according to the fourth embodiment does not judge that a pixel which is located at a position other than a position of the sheet edge is located at the position of the sheet edge, even when the sheet cover is closed and the sheet 20 shifts, or even when a foreign substance or the like exists near the objective dot. The image reader 10C is not likely to erroneously judge the position of the sheet edge, since all the pixels of one line are investigated even when the objective dot satisfying the first to the fourth conditions is found in the middle of one line.

The Fifth Exemplary Embodiment

A fifth exemplary embodiment will be described. A load in operations of an image reader 10D is decreased in the fifth exemplary embodiment by reducing image information to be analyzed using a reduction function without analyzing image information outputted from a CCD as it is. A block diagram of an image reader 10D is shown in FIG. 12 and a processing procedure of the image reader 10D is shown in FIG. 13.

Figure 12:
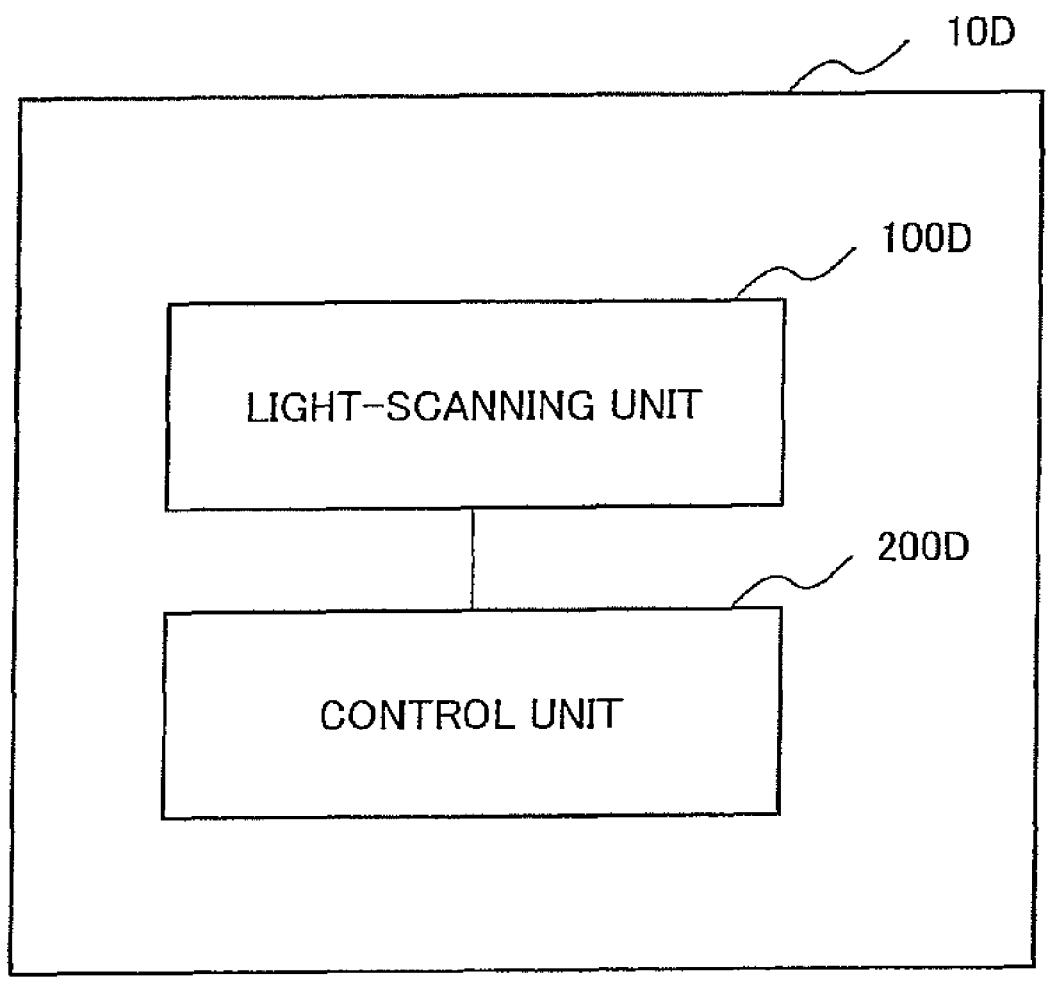
Figure 13:
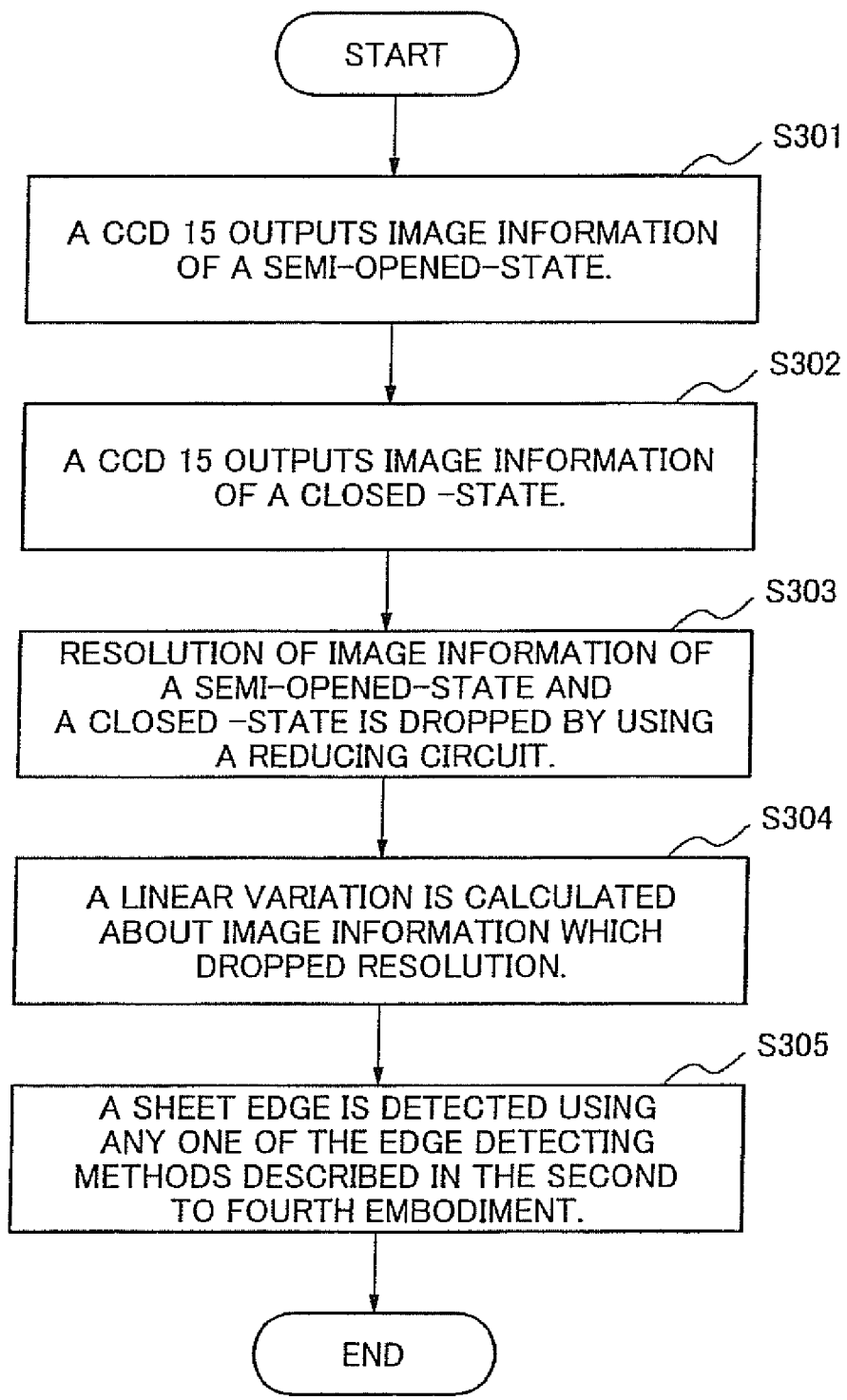
FIG. 13 is a flowchart showing an example of operation of an image reader 10D according to the fifth exemplary embodiment of the present invention.

In FIG. 12 and FIG. 13, the image reader 10D mainly includes a light scanning unit 100D and a control unit 200D. The light scanning unit 100D detects a semi-opened-state of a sheet cover and outputs image information in the semi-opened-state (S301). Moreover, the light scanning unit 100D detects a closed-state of a sheet cover and outputs image information in the closed-state (S302).

Next, the control unit 200D selects a part of image information outputted from the light-scanning unit 100D (dropping resolution) (S303), and calculates a linear variation (S304). Hereafter, the control unit 200D detects a position of a sheet edge using any one of the methods shown in the second to the fourth embodiment.

Here, a reduction function with which a usual image reader is provided standardly is used for selection of image information. For embodiment, when resolving power is dropped to 50%, the control unit 200D selects image information of 3500 pixels for every other pixel from pixel information of about 7000 pixels outputted from the light-scanning unit 100D, and judges a pixel having the largest linear variation in the 3500 pixels corresponds to the position of the sheet edge. Even if a part of image information is reduced by using a reduction function (even if resolving power is dropped), the image reader 10D hardly performs false detection of the position of the sheet edge by using the light-scanning unit 100D with a high resolving power. However, when a reduction function shown in the fifth embodiment is used, it is desirable to use together the judgment method of the true sheet edge described in the third or the fourth embodiment.

As mentioned above, since, in the fifth embodiment, a reduction function with which sheet readers of a copying machine, a facsimile and the like are provided is employed, the load in operations of the image reader 10D can be reduced.

In the edge detecting device 1 and the image readers 10, 10B, 10C and 10D according to the above mentioned exemplary embodiment, the reflected light from the inspecting area includes a reflected light of the inspection light reflected by a predetermined reflective unit, and light quantity of the reflected light reflected by the reflective unit in the second state is relatively larger than light quantity of the reflected light reflected by the reflective unit in the first state.

In the image readers 10, 10B, 10C and 10D according to the above mentioned exemplary embodiment, the calculation circuits 31, 31B and 31C calculate a total of image information in the semi-opened-state (B4O) and a total of image information in the closed-state (B4C) with respect to a pixel with a third predetermined length adjacent to one side of the objective dot. The judgment circuits 41, 41B and 41C judge the objective dot is located at a position of the edge of the object when the total of image information in the semi-opened-state (B4O) is smaller than a first threshold value (O1) and the total of image information in the closed-state (B4C) is larger than a second threshold value (C1).

In the image reader 10C according to the above mentioned exemplary embodiment, the calculation circuit 31C calculates a grand total of the total of the predetermined number of the first light quantity of the one side of the objective dot (TB32O) and a grand total of the total of the predetermined number of the second light quantity of the one side of the objective dot (TB32C). The judgment circuit 41C judges the objective dot is located at the position of the edge of the object when the grand total of the total of the first light quantity (TB32O) is smaller than a third threshold value (O3) and the grand total of the total of the second light quantity (TB32C) is larger than a fourth threshold value (C3).

In the image reader 10D according to the above mentioned exemplary embodiment, the calculation circuit 31D calculates a linear variation with respect to the objective dot extracted at predetermined intervals in the inspecting area.

The image readers 10, 10B, 10C and 10D according to the above mentioned exemplary embodiment includes a state detection circuit 13 for detecting the first state and the second state.

In the image readers 10, 10B, 10C and 10d according to the above mentioned exemplary embodiment, the light-scanning unit 100 and 100D includes a light emitter 17 for emitting the inspection light.

In the edge detection method according to the above mentioned exemplary embodiment, the reflected light from the inspecting area includes a reflected light of the inspection light reflected by a predetermined reflective unit, and light quantity of the reflected light from the reflective unit in the second state is a relatively larger than light quantity of the reflected light from the reflective unit in the first state.

The edge detection method according to the above mentioned exemplary embodiment includes calculating a total of image information in the semi-opened-state (B4O) and a total of image information in the closed-state (B4C) with respect to a pixel with a third predetermined length adjacent to one side of the objective dot, and judging the objective dot is located at a position of the edge of the object when the total of image information in the semi-opened-state (B4O) is smaller than a first threshold value (O1) and the total of image information in the closed-state (B4C) is larger than a second threshold value (C1).

The edge detection method according to the above mentioned exemplary embodiment includes calculating a grand total of the total of the predetermined number of the first light quantity on the one side of the objective dot (TB32O) and a grand total of the total of the predetermined number of the second light quantity on the one side of the objective dot (TB32C), and judging the objective dot is located at a position of the edge of the object when the grand total of the total of the first light quantity (TB32O) is smaller than a third threshold value (O3) and the grand total of the total of the second light quantity (TB32C) is larger than a fourth threshold value (C3).

Here, in order to detect a position of an edge of an object (for example, a sheet), when using a detecting method of the related art 1 described in the background art, the following problems occur. That is, since it is necessary to set the threshold value so that presence of a sheet and absence of the sheet can be distinguished certainly when the detecting method disclosed by the related art 1 is applied, setup of the threshold value is difficult.

In the detecting method disclosed by the related art 1, since image information of a portion without a sheet and image information of a portion with a sheet are equalized, variation of image information near the sheet edge will become small as compared with variation of the portion without the sheet before and after covering with the cover. Accordingly, when the sheet edge enters in a judgment area, a difference of the threshold value and variation is almost lost and it becomes impossible to correctly judge existence of a sheet.

On the other hand, in order to detect an edge of an object, when an edge detecting device and an edge detecting method according to the present invention are utilized, following advantageous effects are obtained. That is, in an edge detecting device, an electronic device, and an edge detecting method concerning the present invention, first light quantity which is a light quantity of a reflected light of a light emitted on a linear inspecting area in a first state, and second light quantity which is a light quantity of a reflected light thereof from an inspecting area in a second state are measured. Variation of the total differences of first light quantity and second light quantity is calculated, and it is judged that the pixel with the largest variation of the total differences is located at the edge of the object. Because variation of the total differences becomes an extreme value at the edge of the object, the edge of the object is exactly detected irrespective of the position thereof.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. An edge detecting device for detecting a position of an edge of an object, comprising:
   a measuring circuit for emitting an inspection light to a linear inspecting area including said object, and measuring first light quantity of a reflected light of said inspection light reflected from said inspecting area in a first state and second light quantity of a reflected light of said inspection light reflected from said inspecting area in a second state;
   a calculation circuit for calculating a difference of said first light quantity and said second light quantity measured by said measuring circuit for each pixel with a first predetermined length, calculating first total differences of reflected lights from pixels with a second predetermined length located adjacent to an objective dot in one direction by totalizing differences between said first and said second light quantity reflected from each of the pixels, and calculating second total differences of reflected lights from the other pixels with said second predetermined length located adjacent to said objective dot in the other direction by totalizing differences between said first and said second light quantity reflected from each of the other pixels; and
   a judgment circuit for judging said objective dot with the largest variation between the first total differences and the second total differences to be a position of said edge.

2. The edge detecting device according to claim 1, wherein said reflected light from said inspecting area includes a reflected light of said inspection light reflected by a predetermined reflective unit, and wherein light quantity of said reflected light reflected by said reflective unit in said second state is relatively larger than light quantity of said reflected light reflected by said reflective unit in said first state.

3. The edge detecting device according to claim 1, wherein said calculation circuit calculates a total of said first light quantity and a total of said second light quantity with respect to a pixel with a third predetermined length adjacent to one side of said objective dot, and wherein said judgment circuit judges said objective dot is located at a position of said edge of said object when said total of said first light quantity is smaller than a first threshold value and said total of said second light quantity is larger than a second threshold value.

4. The edge detecting device according to claim 3, wherein said calculation circuit calculates a grand total of said total of the predetermined number of said first light quantity of said one side of said objective dot and a grand total of said total of the predetermined number of said second light quantity of said one side of said objective dot, and wherein said judgment circuit judges said objective dot is located at said position of said edge of said object when said grand total of said total of said first light quantity is smaller than a third threshold value and said grand total of said total of said second light quantity is larger than a fourth threshold value.

5. The edge detecting device according to claim 1, wherein said calculation circuit calculates variation of said total of said difference with respect to said objective dot extracted at predetermined intervals in said inspecting area.

6. The edge detecting device according to claim 1, further comprising a state detection circuit for detecting said first state and said second state.

7. The edge detecting device according to claim 1, wherein said measuring circuit includes an emitting unit for emitting said inspection light.

8. An electronic device for detecting a position of an edge of an object and performing a predetermined processing, comprising:
   an emitting unit for emitting an inspection light to a linear inspecting area including said object;
   a reflective unit for reflecting said inspection light;
   a measuring circuit for measuring first light quantity of a reflected light of said inspection light reflected from said inspecting area in a first state and second light quantity of a reflected light of said inspection light from said inspecting area in a second state;
   a calculation circuit for calculating a difference of said first light quantity and said second light quantity measured by said measuring circuit for each pixel with a first predetermined length, calculating first total differences of reflected lights from pixels with a second predetermined length located adjacent to an objective dot in one direction by totalizing differences between said first and said second light quantity reflected from each of the pixels, and calculating second total differences of reflected lights from the other pixels with said second predetermined length located adjacent to the objective dot in the other direction by totalizing differences between said first and said second light quantity reflected from each of the other pixels; and
   a judgment circuit for judging said objective dot with the largest variation between the first total differences and the second total differences to be a position of said edge.

9. The electronic device according to claim 8, wherein light quantity of said reflected light from said reflective unit in said second state is relatively larger than said light quantity of said reflected light from said reflective unit in said first state.

10. An edge detection method for detecting a position of an edge of an object, comprising:
    measuring first light quantity of a reflected light of an inspection light reflected from an inspecting area in a first state and second light quantity of a reflected light of said inspection light reflected from said inspecting area in a second state, said inspection light being emitted to said linear inspecting area including an object;
    calculating a difference of said first light quantity and said second light quantity for each pixel with a first predetermined length;
    calculating first total differences of reflected lights from pixels with a second predetermined length located adjacent to an objective dot in one direction by totalizing differences between said first and said second light quantity reflected from each of the pixels;
    calculating second total differences of reflected lights from the other pixels with said second predetermined length located adjacent to said objective dot in the other direction by totalizing differences between said first and said second light quantity reflected from each of the other pixels;
    judging said objective dot with the largest variation between the first total differences and the second total differences to be a position of said edge.

11. The edge detection method according to claim 10, wherein said reflected light from said inspecting area includes a reflected light of said inspection light reflected by a predetermined reflective unit, and light quantity of said reflected light from said reflective unit in said second state is a relatively larger than light quantity of said reflected light from said reflective unit in said first state.

12. The edge detecting method according to claim 10, further comprising:
    calculating a total of said first light quantity and a total of said second light quantity with respect to a pixel with a third predetermined length adjacent to one side of said objective dot; and
    judging said objective dot is located at a position of said edge of said object when said total of said first light quantity is smaller than a first threshold value and said total of said second light quantity is larger than a second threshold value.

13. The edge detecting method according to claim 10, further comprising:
    calculating a grand total of said total of the predetermined number of said first light quantity on said one side of said objective dot and a grand total of said total of the predetermined number of said second light quantity on said one side of said objective dot; and
    judging said objective dot is located at a position of said edge of said object when said grand total of said total of said first light quantity is smaller than a third threshold value and said grand total of said total of said second light quantity is larger than a fourth threshold value.

14. An edge detecting device for detecting a position of an edge of an object, comprising:
    measuring means for emitting an inspection light to a linear inspecting area including said object, and measuring first light quantity of a reflected light of said inspection light reflected from said inspecting area in a first state and second light quantity of a reflected light of said inspection light reflected from said inspecting area in a second state;
    calculation means for calculating a difference of said first light quantity and said second light quantity measured by said measuring means for each pixel with a first predetermined length, calculating first total differences of reflected lights from pixels with a second predetermined length located adjacent to an objective dot in one direction by totalizing differences between said first and said second light quantity reflected from each of the pixels, and calculating second total differences of reflected lights from the other pixels with said second predetermined length located adjacent to said objective dot in the other direction by totalizing differences between said first and said second light quantity reflected from each of the other pixels; and
    judging means for judging said objective dot with the largest variation between the first total differences and the second total differences to be a position of said edge.

* * * * *